(12) United States Patent
Jung et al.

(10) Patent No.: US 11,936,202 B2
(45) Date of Patent: Mar. 19, 2024

(54) HYBRID WIRELESS POWER TRANSMITTING SYSTEM AND METHOD THEREFOR

(71) Applicant: GE HYBRID TECHNOLOGIES, LLC, Niskayuna, NY (US)

(72) Inventors: Chun-Kil Jung, Seoul (KR); Byong-Uk Hwang, Incheon (KR)

(73) Assignee: GE Hybrid Technologies, LLC, Niskayuna, NY (US)

( * ) Notice: Subject to any disclaimer, the term of this patent is extended or adjusted under 35 U.S.C. 154(b) by 0 days.

(21) Appl. No.: 17/806,426

(22) Filed: Jun. 10, 2022

(65) Prior Publication Data

US 2022/0302762 A1    Sep. 22, 2022

Related U.S. Application Data

(63) Continuation of application No. 17/321,791, filed on May 17, 2021, now Pat. No. 11,362,544, which is a
(Continued)

(30) Foreign Application Priority Data

Oct. 31, 2013   (KR) .................. 10-2013-0130959
Nov. 8, 2013    (KR) .................. 10-2013-0135609
(Continued)

(51) Int. Cl.
*H02J 50/12*     (2016.01)
*H02J 7/00*      (2006.01)
(Continued)

(52) U.S. Cl.
CPC .......... *H02J 50/12* (2016.02); *H02J 7/00302* (2020.01); *H02J 50/10* (2016.02); *H02J 50/40* (2016.02); *H02J 50/60* (2016.02); *H02J 50/80* (2016.02)

(58) Field of Classification Search
CPC .. H02J 50/12; H02J 50/10; H02J 50/40; H02J 50/60; H02J 50/80
See application file for complete search history.

(56) References Cited

U.S. PATENT DOCUMENTS

| 10,014,725 | B2 | 7/2018 | Jung et al. |
| 10,778,037 | B2 | 9/2020 | Jung et al. |

(Continued)

FOREIGN PATENT DOCUMENTS

| CN | 102263441 | 11/2011 |
| CN | 102882286 | 1/2013 |

(Continued)

OTHER PUBLICATIONS

U.S. Appl. No. 16/994,934, Jung, et al.
(Continued)

*Primary Examiner* — Metasebia T Retebo
(74) *Attorney, Agent, or Firm* — DeLizio, Peacock, Lewin & Guerra LLP

(57) ABSTRACT

The present disclosure provides a signal processing method performed by a hybrid wireless power transmitting apparatus which is configured to transmit wireless power signals based on magnetic resonance and magnetic induction, the method comprising transmitting a first object detection signal via an inductive power transmitting unit and a second object detection signal via a magnetic resonant power transmitting unit alternatively; operating one of the inductive power transmitting unit and the magnetic resonant power transmitting unit which is selected based on an inductive response signal and a resonant response signal corresponding to the first object detection signal and the second object detection signal respectively; and transmitting wireless
(Continued)

power signal via the selected power transmitting unit; and a hybrid wireless power transmitting apparatus using the method.

20 Claims, 24 Drawing Sheets

Related U.S. Application Data continuation of application No. 16/994,934, filed on Aug. 17, 2020, now Pat. No. 11,038,378, which is a continuation of application No. 15/973,600, filed on May 8, 2018, now Pat. No. 10,778,037, which is a continuation of application No. 15/033,449, filed as application No. PCT/KR2013/010409 on Nov. 15, 2013, now Pat. No. 10,014,725.

(30) Foreign Application Priority Data

| Nov. 14, 2013 | (KR) | .................. 10-2013-0138101 |
| Nov. 14, 2013 | (KR) | .................. 10-2013-0138107 |

(51) Int. Cl.
| H02J 50/10 | (2016.01) |
| H02J 50/40 | (2016.01) |
| H02J 50/60 | (2016.01) |
| H02J 50/80 | (2016.01) |

(56) References Cited

U.S. PATENT DOCUMENTS

| 11,038,378 B2 | 6/2021 | Jung et al. | |
| 2011/0025264 A1* | 2/2011 | Mochida | H02J 50/10 |
| | | | 320/108 |
| 2011/0140671 A1 | 6/2011 | Kim et al. | |
| 2011/0279244 A1* | 11/2011 | Park | H02J 50/90 |
| | | | 320/108 |
| 2012/0133335 A1 | 5/2012 | Tanabe | |
| 2012/0223593 A1 | 9/2012 | Kamata | |
| 2013/0049484 A1 | 2/2013 | Weissentern et al. | |
| 2013/0076306 A1 | 3/2013 | Lee et al. | |
| 2014/0152114 A1 | 6/2014 | Kim et al. | |
| 2014/0333259 A1 | 11/2014 | Akiyoshi et al. | |
| 2016/0141882 A1* | 5/2016 | Ichikawa | H04B 5/0037 |
| | | | 307/104 |
| 2016/0254705 A1 | 9/2016 | Jung et al. | |
| 2017/0098957 A1 | 4/2017 | Sanker | |
| 2017/0222470 A1 | 8/2017 | Akiyosh et al. | |
| 2018/0262056 A1 | 9/2018 | Jung et al. | |
| 2019/0288561 A1 | 9/2019 | Bae et al. | |
| 2020/0381952 A1 | 12/2020 | Jung et al. | |
| 2021/0273488 A1 | 9/2021 | Jung et al. | |

FOREIGN PATENT DOCUMENTS

| CN | 103296786 | 9/2013 |
| JP | 2010088143 | 4/2010 |
| JP | 2012120260 | 6/2012 |
| JP | 2013106515 | 5/2013 |
| KR | 10-2011-0032260 | 3/2011 |
| KR | 10-2011-0066827 | 6/2011 |
| KR | 10-2013-0033867 | 4/2013 |
| KR | 10-2013-0070612 | 6/2013 |
| KR | 10-2013-0098730 | 9/2013 |
| KR | 10-2013-0102218 | 9/2013 |
| KR | 10-2013-0112233 | 10/2013 |
| KR | 10-2013-0123349 | 11/2013 |
| KR | 10-2015-0053536 | 5/2015 |
| KR | 10-2015-0055753 | 5/2015 |
| KR | 10-2015-0055755 | 5/2015 |
| WO | 2011063108 | 5/2011 |
| WO | 2015064815 | 5/2015 |

OTHER PUBLICATIONS

U.S. Appl. No. 17/321,791, Jung, et al.
"Chinese Application No. 201380080704.8, First Office Action and Search", dated Jan. 11, 2018.
"Korean Application No. 10-2013-0130959 Notification of Reason for Refusal", dated Jan. 6, 2020, 2 pages.
"Korean Application No. 10-2013-0138101 Notification of Reason for Refusal", dated Dec. 9, 2019, 4 pages.
"Korean Application No. 10-2013-0138107 Final Rejection", dated Jun. 10, 2020, 2 pages.
"Korean Application No. 10-2013-0138107 Notification of Reason for Refusal", dated Dec. 9, 2019, 3 pages.
"Korean Application No. 10-2020-0107258 Notification of Reason for Refusal", dated Dec. 16, 2020, 2 pages.
"Korean Application No. 10-2020-0175347 Final Rejection", dated Aug. 25, 2021, 3 pages.
"Korean Application No. 10-2020-0175347 Notification of Reason for Refusal", dated Mar. 10, 2021, 3 pages.
"Korean Application No. 10-2021-0005386 Notification of Reason for Refusal", dated May 10, 2021, 4 pages.
"Korean Application No. 10-2021-0065518 Notification of Reason for Refusal", dated Sep. 2, 2021, 2 pages.
"PCT Application No. PCT/KR2013/010409 International Preliminary Report on Patentability", dated May 12, 2016, 14 pages.
"PCT Application No. PCT/KR2013/010409 International Search Report and Written Opinion", dated Jul. 24, 2014, 14 pages.
"Qi System Description Wireless Power Transfer", Wireless Power Consortium, vol. 1:Low Power, Part 1:Interface Definition, Version 1.0.1, Oct. 2010, 88 pages.
"U.S. Appl. No. 15/973,600 Office Action", dated Mar. 26, 2020, 6 pages.
"U.S. Appl. No. 16/994,934 Office Action", dated Oct. 1, 2020, 11 pages.
"U.S. Appl. No. 17/321,791 Office Action", dated Sep. 27, 2021, 9 pages.
"Korea Application No. 10-2022-0031479 Request for the Submission of an Opinion", dated Jul. 21, 2022, 3 pages.
"Korean Application No. 10-2022-0025835 Notice of Submission of Opinion", dated Jun. 8, 2022, 5 pages.
"Korea patent application No. 10-2022-0025835 Request for Submission of Opinion", dated Dec. 28, 2022, 5 pages.
"Korea patent application No. 10-2022-0056007 Request for the Submission of an Opinion", dated Jan. 9, 2023, 3 pages.
"Korea patent application No. 10-2022-0031479 Notice of Final Rejection", dated Jan. 11, 2023, 3 pages.
"Korea patent application No. 10-2022-0005915 2nd Final Rejection", dated Jan. 9, 2023, 2 pages.
"Korea application No. 10-2022-0056007 Request for Submission of an Opinion", dated Jan. 9, 2023, 3 pages.
"Korea application No. 10-2023-0101739 Request for the Submission of an Opinion", dated Oct. 4, 2023, 3 pages.
"Korea patent application No. 10-2023-0047024 Request for Sumbission of an Opinion", dated Oct. 4, 2023, 3 pages.
"Korean application No. 10-2022-0056007 Notice of Final Rejection", dated Aug. 30, 2023, 3 pages.

* cited by examiner

Figure 12

HYBRID WIRELESS POWER TRANSMITTING SYSTEM AND METHOD THEREFOR

CROSS-REFERENCE TO RELATED APPLICATIONS

This Patent Application is a continuation of U.S. patent application Ser. No. 17/321,791, filed May 17, 2021, which is a continuation of U.S. patent application Ser. No. 16/994,934 filed Aug. 17, 2020, which is a continuation of U.S. patent application Ser. No. 15/973,600 filed May 8, 2018, which is a continuation of U.S. patent application Ser. No. 15/033,449 filed Apr. 29, 2016, which is a national stage of International Application No. PCT/KR2013/010409, filed Nov. 15, 2013, and claims the priority benefit of Korean Application No. 10-2013-0130959, filed Oct. 31, 2013, Korean Application No. 10-2013-0135609, filed Nov. 8, 2013, Korean Application No. 10-2013-0138101, filed Nov. 14, 2013, and Korean Application No. 10-2013-0138107, filed Nov. 14, 2013, in the Korean Intellectual Property Office. The disclosures of the prior Applications are considered part of and incorporated by reference in this Patent Application.

TECHNICAL FIELD

The present disclosure relates to a hybrid wireless power transmitting apparatus and a method for the system.

DESCRIPTION OF THE RELATED TECHNOLOGY

The advance of wireless communication technology has brought a ubiquitous information environment where people can get any information that they want at any time and any place. However, most communication information devices still rely on batteries, and use of the devices are limited since they receive power via power lines.

Therefore, the wireless information network environment cannot be fully utilized unless the problem related to device power is solved.

To solve the problem, various methods for wireless power transmission are under development, typical examples of which include a microwave receiving method, a method based on magnetic induction utilizing magnetic field, or a method based on magnetic resonance due to energy conversion between magnetic and electric fields.

The microwave receiving method has an advantage that power can be transmitted a long distance since microwaves can be radiated into the air through an antenna, but efficiency of power transmission is restricted due to considerable radiation loss in the air.

On the other hand, the magnetic induction method makes use of magnetic energy coupling due to primary and secondary coils, utilizing a transmitting coil as a transmitter and the secondary coil as a receiver. The magnetic induction exhibits a high efficiency of power transmission. However, it is also limited because the first and the second coil have to be located within a short distance of a few millimeters, and efficiency of power transmission is rapidly changed according to the arrangement of the first and the second coil.

Due to these reasons, a method based on magnetic resonance is getting more attention these days, which is similar to the method based on magnetic induction, but transmits power in the form of magnetic energy by concentrating the energy at a specific resonant frequency determined by coil-type inductors (L) and capacitors (C). The magnetic resonance method is advantageous since it can transmit relatively large energy a long distance of up to a few meters, but this also requires a high quality resonance factor. In other words, the magnetic resonance method is disadvantageous in that efficiency of power transmission changes rapidly according to how well impedance matching or resonant frequency matching is performed.

Accordingly, in the technical field to which the present disclosure belongs, taking into account the fact that a method based on magnetic induction is more advantageous if the distance between transmitting and receiving coils is short while a method based on magnetic resonance is more advantageous when the distance between the transmitting and receiving coils is large, a hybrid wireless power transmission system is being proposed which utilizes advantages of both of the magnetic induction method and the magnetic resonance method.

SUMMARY

The present disclosure provides a signal processing method for a hybrid wireless power transmitting system capable of transmitting a wireless power signal by checking whether a wireless power receiving apparatus receiving the wireless power signal relies on magnetic induction or magnetic resonance and capable of transmitting a wireless power signal based on magnetic resonance and a wireless power signal based on magnetic induction; and a hybrid wireless power transmitting apparatus using the method.

The present disclosure also provides a wireless power transmitting system capable of improving control efficiency and simplifying structure by allowing a wireless power receiving apparatus to take part in impedance matching of the wireless power transmitting system; and capable of transmitting and receiving an inductive power signal and a resonant power signal.

The present disclosure also provides a hybrid wireless power transmitting apparatus capable of simultaneous charging by transmitting an inductive power signal and a resonant power signal simultaneously to an induction power receiving apparatus and a magnetic resonance receiving apparatus and capable of transmitting a resonant power signal and an inductive power signal; and a hybrid wireless power transmitting system including the hybrid wireless power transmitting apparatus.

The present disclosure also provides a hybrid wireless power transmitting apparatus capable of simultaneous charging by transmitting an inductive power signal and a resonant power signal simultaneously to an induction power receiving apparatus and a magnetic resonance receiving apparatus and capable of transmitting a resonant power signal and an inductive power signal; and a hybrid wireless power transmitting system including the hybrid wireless power transmitting apparatus.

To solve the problem above, a signal processing method performed by a hybrid wireless power transmitting apparatus which is configured to transmit wireless power signals based on magnetic resonance and magnetic induction according to an embodiment of the present disclosure is provided. The method comprises transmitting a first object detection signal via an inductive power transmitting unit and a second object detection signal via a magnetic resonant power transmitting unit alternatively; operating one of the inductive power transmitting unit and the magnetic resonant power transmitting unit which is selected based on an inductive response signal and a resonant response signal corresponding to the first object detection signal and the second object detection signal respectively; and transmitting wireless power signal via the selected power transmitting unit.

According to an aspect of an embodiment of the present disclosure, the inductive response signal is an amplitude-shift keying (ASK) signal from an inductive power receiving apparatus, and the resonant response signal is a frequency-shift keying (FSK) signal from a resonant wireless power receiving apparatus.

According to an aspect of an embodiment of the present disclosure, the step of operating one of the inductive power transmitting unit and the magnetic resonant power transmitting unit which is selected based on an inductive response signal and a resonant response signal corresponding to the first object detection signal and the second object detection signal includes: selecting a power transmitting unit corresponding to a response signal received earlier than the other response signal.

According to an aspect of an embodiment of the present disclosure, the step of operating one of the inductive power transmitting unit and the magnetic resonant power transmitting unit which is selected based on an inductive response signal and a resonant response signal corresponding to the first object detection signal and the second object detection signal includes selecting the magnetic resonant power transmitting unit based on the resonant response signal and operating the magnetic resonant power transmitting unit, and wherein the step of transmitting wireless power signal via the selected power transmitting unit includes receiving power status information from a wireless power receiving apparatus through a near communication module of the magnetic resonant power transmitting unit, and controlling the wireless power signal based on the power status information.

According to an aspect of an embodiment of the present disclosure, the step of operating one of the inductive power transmitting unit and the magnetic resonant power transmitting unit which is selected based on an inductive response signal and a resonant response signal corresponding to the first object detection signal and the second object detection signal includes selecting the inductive power transmitting unit based on the inductive response signal and operating inductive power transmitting unit, and wherein the step of transmitting wireless power signal via the selected power transmitting unit includes receiving power status information from a wireless power receiving apparatus through a transmitting coil of the inductive power transmitting unit, and controlling the wireless power signal based on the power status information.

According to an aspect of an embodiment of the present disclosure, the step of operating one of the inductive power transmitting unit and the magnetic resonant power transmitting unit which is selected based on an inductive response signal and a resonant response signal corresponding to the first object detection signal and the second object detection signal includes, if both of the inductive response signal and the resonant response signal are received, transmitting an inductive resonant detection signal via the inductive power transmitting unit and a magnetic resonant detection signal via the magnetic resonant power transmitting unit, wherein the inductive resonant detection signal is a frequency change step signal and the magnetic resonant detection signal is a voltage change step signal; and if a resonant frequency of inductive frequency information corresponding to the inductive resonant detection signal is above a reference frequency and a resonant voltage of resonant voltage information corresponding to the magnetic resonant detection signal is below a reference voltage, selecting and operating the magnetic resonant power transmitting unit; and if a resonant frequency of the inductive resonant detection signal is below a reference frequency and a resonant voltage of the magnetic resonant detection signal is above a reference voltage, selecting and operating the inductive power transmitting unit.

The frequency change step signal may be a frequency change signal from 110 kHz to 205 kHz, the voltage change step signal is a voltage change step signal from 5 volts (V) to 20V at 6.78 MHz±5%.

A hybrid wireless power transmitting apparatus configured to transmit wireless power signals based on magnetic resonance and magnetic induction according to another embodiment of the present disclosure is provided. The apparatus includes an inductive power transmitting unit configured to transmit a wireless power signal based on the magnetic induction; a magnetic resonant power transmitting unit configured to transmit a wireless power signal based on the magnetic resonance; and a controller configured to transmit a first object detection signal via the inductive power transmitting unit and a second object detection signal via the magnetic resonant power transmitting unit alternatively, to select one of the inductive power transmitting unit and the magnetic resonant power transmitting unit based on an inductive response signal and a resonant response signal corresponding to the first object detection signal and the second object detection signal respectively, to operate the selected power transmitting unit, and to control the transmission of a wireless power signal via the selected power transmitting unit.

According to an aspect of another embodiment of the present disclosure, the response signal may be one of an ASK signal from an inductive power receiving apparatus and a FSK signal from a resonant wireless power receiving apparatus.

According to an aspect of another embodiment of the present disclosure, the controller is further configured to select a power transmitting unit corresponding to a response signal received earlier than the other response signal.

According to an aspect of another embodiment of the present disclosure, the controller may be further configured to select the magnetic resonant power transmitting unit based on the resonant response signal, to operate the magnetic resonant power transmitting unit, to receive power status information from a wireless power receiving apparatus through a near communication module of the magnetic resonant power transmitting unit, and to control the wireless power signal based on the power status information.

According to an aspect of another embodiment of the present disclosure, the controller may be further configured to select the inductive power transmitting unit based on the inductive response signal, to operate inductive power transmitting unit, to receive power status information from a wireless power receiving apparatus through a transmitting coil of the inductive power transmitting unit, and to control the wireless power signal based on the power status information.

According to an aspect of another embodiment of the present disclosure, the controller may be further configured to transmit an inductive resonant detection signal via the inductive power transmitting unit and a magnetic resonant detection signal via the magnetic resonant power transmitting unit if both of the inductive response signal and the resonant response signal are received, wherein the inductive resonant detection signal is a frequency change step signal and the magnetic resonant detection signal is a voltage change step signal; configured to select and operate the magnetic resonant power transmitting unit if a resonant frequency of inductive frequency information corresponding to the inductive resonant detection signal is above a reference frequency and a resonant voltage of resonant voltage information corresponding to the magnetic resonant detection signal is below a reference voltage; and configured to select and operate the inductive power transmitting unit if a resonant frequency of the inductive resonant detection signal is below a reference frequency and a resonant voltage of the magnetic resonant detection signal is above a reference voltage.

According to an aspect of another embodiment of the present disclosure, the frequency change step signal may be a frequency change signal at 6.78 MHz±5%, and the voltage change step signal is a voltage change step signal from 5V to 20V at 6.78 MHz±5%.

According to an aspect of another embodiment of the present disclosure, the inductive power transmitting unit may include a transmitting coil, the magnetic resonant power transmitting unit includes a loop antenna locating around the transmitting coil, the first object detection signal is transmitted by the transmitting coil, the resonant power object detection signal is transmitted by the loop antenna.

To solve the problem above, a hybrid wireless power transmitting apparatus according to an embodiment of the present disclosure is provided. The apparatus includes a transmitting coil configured to receive an inductive power signal; an antenna configured to locate around the transmitting coil and to receive a resonant power signal; a rectifying unit configured to generate rectified power by rectifying an alternative power generated from the inductive power signal and the resonant power signal; a converter configured to convert the rectified power; a voltage stabilization circuit connected between the rectifying unit and the converter; and a receiving controller configured to control supply of the rectified power to the voltage stabilization circuit if the resonant power signal and the inductive power signal are received at an initial stage, to control supply of the rectified power to the converter after turning off the voltage stabilization circuit if a power rectified by the resonant power signal and the inductive power signal is determined to be within a reference range.

According to an aspect of an embodiment of the present disclosure, the hybrid wireless power transmitting apparatus includes a variable condenser connected to the antenna, wherein the receiving controller is further configured to control to receive an initial resonant power signal at a receiving frequency separated from a resonant frequency by adjusting the variable condenser if the antenna detects a magnetic resonant based wireless power transmitting apparatus.

According to an aspect of an embodiment of the present disclosure, the receiving controller may be further configured to control to receive the resonant power receiving signal at the resonant frequency by re-adjusting the variable condenser after a reference time elapses from the reception time of the initial resonant power signal.

According to an aspect of an embodiment of the present disclosure, the hybrid wireless power receiving apparatus may include a near communication module configured to transmit charging status information generated by the resonant power signal.

According to an aspect of an embodiment of the present disclosure, the hybrid wireless power receiving apparatus may further include a voltage sensor connected between the rectifying unit and the converter, wherein the receiving controller is further configured to control supply of the rectified power to the converter after turning off the voltage stabilization circuit if a voltage measured by the voltage sensor becomes within a reference range.

According to an aspect of an embodiment of the present disclosure, the rectifying unit may include a resonant rectifying unit configured to rectify a power generated by the resonant power signal; an inductive rectifying unit configured to rectify a power generated by the inductive power signal; and a switching unit configured to select one of the resonant rectifying unit and the inductive rectifying unit.

A method of controlling a wireless power signal in a hybrid type wireless power receiving apparatus according to another embodiment of the present disclosure includes: turning on a voltage stabilization unit which is connected to the output of a rectifying unit if one of the resonant power signal and the inductive power signal is received from a magnetic resonant based transmitting apparatus at an initial stage; and supplying the rectified power to a converter after turning off the voltage stabilization circuit if a power rectified by the resonant power signal and the inductive power signal is determined to be within a reference range.

According to an aspect of another embodiment of the present disclosure, the resonant power signal may be received by a loop antenna, and the inductive power signal is received by a receiving coil which is surrounded by the loop antenna.

According to an aspect of another embodiment of the present disclosure, the step of turning on a voltage stabilization unit which is connected to the output of a rectifying unit if one of the resonant power signal and the inductive power signal is received from a magnetic resonant based transmitting apparatus at an initial stage includes: receiving an initial resonant power signal at a receiving frequency separated from a resonant frequency by adjusting the variable condenser connected to an antenna when an initial resonant power signal is received.

A method of controlling a wireless power signal in a hybrid type wireless power receiving apparatus further includes: receiving the resonant power receiving signal at the resonant frequency by re-adjusting the variable condenser after a reference time elapses from the reception time of the initial resonant power signal.

A wireless power receiving apparatus based on magnetic resonance according to yet another embodiment of the present disclosure includes: an antenna configured to receive a resonant power signal; a variable condenser connected to the antenna; a rectifying unit configured to generate a rectified power by rectifying an alternative power generated from the resonant power signal; a converter configured to convert the rectified power; a resonant receiving controller configured to control to receive an initial resonant power signal at a receiving frequency separated from a resonant frequency by adjusting the variable condenser if the antenna detects a magnetic resonant based wireless power transmitting apparatus.

According to an aspect of yet another embodiment of the present disclosure, the resonant receiving controller is further configured to control to receive the resonant power receiving signal at the resonant frequency by re-adjusting the variable condenser after a reference time elapses from the reception time of the initial resonant power signal.

To solve the problem above, a hybrid wireless power transmitting system including a hybrid wireless power transmitting apparatus for transmitting an inductive power signal and a resonant power signal and a wireless power receiving apparatus for receiving a power signal from the hybrid wireless power transmitting apparatus is provided. The wireless power transmitting apparatus includes a transmitting coil configured to transmit the inductive power signal; a transmitting antenna configured to transmit the resonant power signal; a first variable capacitor block connected to the transmitting coil and the transmitting antenna; and a transmitting controller configured to: perform an inductive main impedance matching by controlling the first variable capacitor block and by operating the transmitting coil if the wireless power receiving apparatus is an inductive power receiving apparatus; and perform a resonant main impedance matching by controlling the first variable capacitor block and by operating the transmitting antenna if the wireless power receiving apparatus is a resonant power receiving apparatus. The wireless power receiving apparatus includes a receiving block configured to receive at least one of a resonant power signal and the inductive power signal; a second variable capacitor block connected to the receiving block; and a receiving controller configured to control the second variable capacitor block to perform an auxiliary impedance matching with the wireless transmitting apparatus.

The first variable capacitor block may further includes a first main capacitor block connected to the transmitting coil; a second main capacitor block connected to the transmitting antenna; and a main switching unit configured to select one of the first main capacitor block and the second main capacitor block under the control of the transmitting controller.

The first main capacitor block may include a plurality of main inductive capacitors connected in serial or parallel with each other, and an inductive transmitting switch connected between the main inductive capacitors, wherein the transmitting controller performs the inductive main impedance matching by turning on and off the inductive transmitting switch.

The second main capacitor block may include a plurality of main resonant capacitors connected in serial or parallel with each other, and a resonant transmitting switch connected between the main resonant capacitors, wherein the transmitting controller performs a resonant main impedance matching by turning on and off the resonant transmitting switch.

The receiving block may include a receiving coil for receiving the inductive power signal, and a receiving antenna for receiving the resonant power signal.

The second variable capacitor block may include a first auxiliary capacitor block connected to the receiving coil; a second auxiliary capacitor block connected to the receiving antenna; and an auxiliary switching unit configured to select one of the first auxiliary capacitor block and the second auxiliary capacitor block under the control of the receiving controller.

The first auxiliary capacitor block may include a plurality of auxiliary inductive capacitors connected in serial or parallel with each other, and an inductive receiving switch connected between the auxiliary inductive capacitors, wherein the receiving performs an inductive auxiliary impedance matching by turning on and off the inductive receiving switch.

The second auxiliary capacitor block may include a plurality of auxiliary resonant capacitors connected in serial or parallel with each other, and a resonant receiving switch connected between the auxiliary resonant capacitors, wherein the receiving controller performs a resonant auxiliary impedance matching by turning on and off the resonant receiving switch.

According to yet another embodiment of the present disclosure, a wireless power transmitting system including a wireless power transmitting apparatus and a wireless power receiving apparatus is provided. The wireless power transmitting apparatus includes a transmitting block configured to transmit a wireless power signal; a first variable capacitor block connected to the transmitting block; and a transmitting controller configured to control the first variable capacitor block for a main impedance matching when the wireless power receiving apparatus is placed in charging position. The wireless power receiving apparatus includes a receiving block configured to receive the wireless power signal; a second variable capacitor block connected to the receiving block; and a receiving controller configured to control the second variable capacitor block for an auxiliary impedance matching with the transmitting block.

The first variable capacitor block may further include a plurality of main capacitors connected in serial or parallel with each other, and a transmitting switch connected between the main capacitors, wherein the transmitting controller performs the main impedance matching by turning on and off the transmitting switch.

The second variable capacitor block may further include a plurality of auxiliary capacitors connected in serial or parallel with each other, and a receiving switch connected between the auxiliary capacitors, wherein the receiving controller performs the auxiliary impedance matching by turning on and off the receiving switch.

To solve the problem above, a hybrid wireless power transmitting apparatus configured to transmit a resonant power signal and an inductive power signal according to an embodiment of the present disclosure is provided. The apparatus includes an inductive power transmitting unit configured to transmit the inductive power signal, the inductive power transmitting unit including a transmitting coil and a first variable capacitor block connected to the transmitting coil; a magnetic resonant power transmitting unit configured to transmit the resonant power signal, the magnetic resonant power transmitting unit including an antenna and a second variable capacitor block connected to the antenna; and a transmitting controller configured to control the inductive power transmitting unit and the magnetic resonant power transmitting unit for simultaneous transmission of the inductive power signal and the resonant power signal by adjusting the first variable capacitor block and the second variable capacitor block when an inductive power receiving apparatus is placed in a charging position and when a magnetic resonant power receiving apparatus is placed in a charging distance.

Each of the first capacitor block and the second capacitor block may include a plurality of capacitors and a switching unit which is connected between the capacitors.

The magnetic resonant transmitting unit may further include a near communication unit for receiving a resonant power status information from a resonant receiving apparatus, and the transmitting controller attempts an impedance matching by adjusting capacitance of the first and the second variable capacitor block based on the resonant power status information and inductive power status information received through the transmitting coil.

The transmitting controller may attempt an impedance matching by randomly adjusting capacitance of the first and the second variable capacitor block.

The transmitting controller may attempt an impedance matching of the first variable capacitor block after performing an impedance matching of the second variable capacitor block.

A hybrid wireless power transmitting system according to another embodiment of the present disclosure includes a hybrid wireless power transmitting apparatus described above; an inductive power receiving apparatus including a receiving coil, a third variable capacitor block connected to the receiving coil, and an inductive receiving controller adjusting capacitance of the third variable capacitor block; and a magnetic resonant receiving apparatus including a receiving antenna, a fourth variable capacitor block and a resonant receiving controller adjusting capacitance of the fourth variable capacitor block.

The inductive receiving controller may perform a fine control of the capacitance of the third variable capacitor block.

The resonant receiving controller may perform a fine control of the capacitance of the fourth variable capacitor block.

To solve the problem above, a hybrid wireless power transmitting apparatus configured to transmit a resonant power signal and an inductive power signal according to an embodiment of the present disclosure is provided. The apparatus includes an inductive power transmitting unit configured to transmit the inductive power signal, the inductive power transmitting unit including a transmitting coil and a first variable capacitor block connected to the transmitting coil; a magnetic resonant power transmitting unit configured to transmit the resonant power signal, the magnetic resonant power transmitting unit including an antenna and a second variable capacitor block connected to the antenna; and a transmitting controller configured to control the inductive power transmitting unit and the magnetic resonant power transmitting unit for simultaneous transmission of the inductive power signal and the resonant power signal by adjusting the first variable capacitor block and the second variable capacitor block when an inductive power receiving apparatus is placed in a charging position and when a magnetic resonant power receiving apparatus is placed in a charging distance.

Each of the first capacitor block and the second capacitor block may include a plurality of capacitors and a switching unit which is connected between the capacitors.

The magnetic resonant transmitting unit may further include a near communication unit for receiving a resonant power status information from a resonant receiving apparatus, and the transmitting controller attempts an impedance matching by adjusting capacitance of the first and the second variable capacitor block based on the resonant power status information and inductive power status information received through the transmitting coil.

The transmitting controller may attempt an impedance matching by randomly adjusting capacitance of the first and the second variable capacitor block.

The transmitting controller may attempt an impedance matching of the first variable capacitor block after performing an impedance matching of the second variable capacitor block.

A hybrid wireless power transmitting system according to another embodiment of the present disclosure includes a hybrid wireless power transmitting apparatus described above; an inductive power receiving apparatus including a receiving coil, a third variable capacitor block connected to the receiving coil, and an inductive receiving controller adjusting capacitance of the third variable capacitor block; and a magnetic resonant receiving apparatus including a receiving antenna, a fourth variable capacitor block and a resonant receiving controller adjusting capacitance of the fourth variable capacitor block.

The inductive receiving controller may perform a fine control of the capacitance of the third variable capacitor block.

The resonant receiving controller may perform a fine control of the capacitance of the fourth variable capacitor block.

Advantageous Effects

According to one embodiment of the present disclosure above, by checking the type of a wireless power receiving apparatus through an antenna and a transmitting coil and accordingly transmitting a wireless power signal based on an appropriate scheme, an inductive wireless power receiving apparatus and a resonant wireless power receiving apparatus can be charged.

Also, in case a wireless power receiving apparatus is a hybrid type, a wireless power signal with more improved transmission efficiency can be transmitted.

Also, since the type of a wireless power receiving apparatus can be checked without using a separate communication unit or detection sensor, the number of components can be reduced, and manufacturing costs can be reduced.

According to one embodiment of the present disclosure above, since charging can be performed by receiving both of an inductive power signal and a resonant power signal irrespective of the type of a transmitting apparatus, compatibility among apparatus is improved.

Also, according to one embodiment of the present disclosure, an abrupt voltage rise out of a reference range which can occur at the initial charging step can be prevented, which contributes to improvement of durability of related products.

According to one embodiment of the present disclosure above, since both of a wireless power transmitting apparatus and a wireless power receiving apparatus take part in impedance matching, control efficiency for impedance matching is improved.

Also, since change of capacitance for impedance matching is performed through a simple combination of a series-parallel circuit and a switch, various capacitance values can be configured even with a smaller number of capacitors and switches.

According to one embodiment of the present disclosure above, a hybrid wireless power transmitting apparatus can charge both of an inductive power receiving apparatus and a magnetic resonant receiving apparatus placed within a charging distance by transmitting a wireless power signal to both of the apparatus.

Also, the present disclosure can maximize transmission efficiency of resonant charging and inductive charging by compensating the interference which may occur as a transmitting coil and a transmitting antenna are operated at the same time by changing capacitance.

According to one embodiment of the present disclosure above, a hybrid wireless power transmitting apparatus can charge both of an inductive power receiving apparatus and a magnetic resonant receiving apparatus placed within a charging distance by transmitting a wireless power signal to both of the apparatus.

Also, the present disclosure can maximize transmission efficiency of resonant charging and inductive charging by compensating the interference which may occur as a transmitting coil and a transmitting antenna are operated at the same time by changing capacitance.

BRIEF DESCRIPTION OF THE DRAWINGS

FIG. 12 is a flow diagram illustrating a wireless power transmission control method according to a hybrid wireless power receiving apparatus according to a second embodiment of the present disclosure.

DESCRIPTION OF EXEMPLARY EMBODIMENTS

In what follows, a hybrid wireless power transmitting system and a method for the system according to the present disclosure will be described in more detail with reference to appended drawings.

First Embodiment

Figure 1:
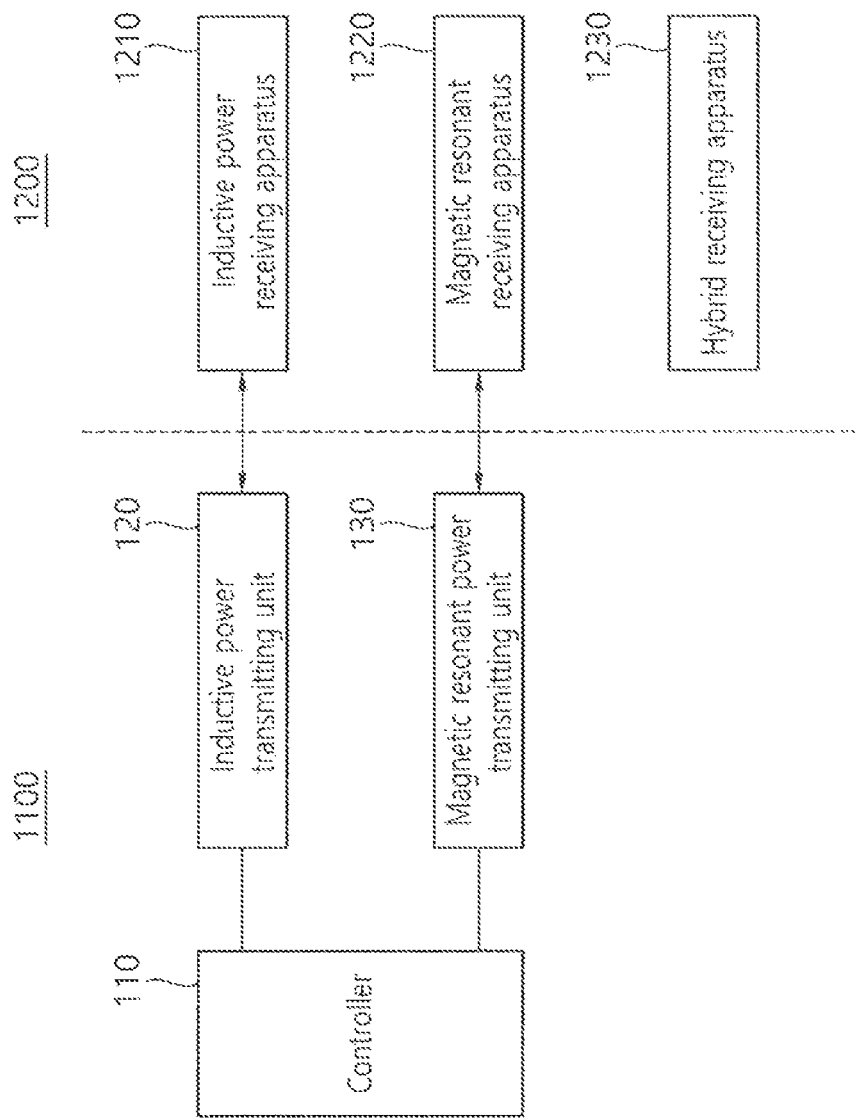
FIG. 1 illustrates a block diagram of a wireless power transmitting system including a hybrid wireless power transmitting apparatus according to a first embodiment of the present disclosure.

FIG. 1 illustrates a block diagram of a wireless power transmitting system including a hybrid wireless power transmitting apparatus according to a first embodiment of the present disclosure.

As shown in the figure, a wireless power system according to the present disclosure comprises a hybrid wireless power transmitting apparatus 1100 and a wireless power receiving apparatus 1200.

A hybrid wireless power transmitting apparatus 1100 according to the present disclosure can comprise an inductive power transmitting unit 120, a magnetic resonant power transmitting unit 130, and a controller 110, where an inductive power receiving apparatus 1210, magnetic resonant receiving apparatus 1220, and hybrid wireless power receiving apparatus 1230 can be used as the wireless power receiving apparatus 1200.

To be more specific, a first object detection signal through the inductive power transmitting unit 120 and a second object detection signal through the magnetic resonant power transmitting unit 130 are transmitted in an alternate fashion. Then either of the inductive power transmitting unit 120 and the magnetic resonant power transmitting unit 130 is selected and operated on the basis of an inductive response signal and a resonant response signal corresponding to the first object detection signal and the second object detection signal. Afterwards, whether a wireless power receiving apparatus which receives a wireless power signal can receive a wireless power signal based on magnetic resonance, which is a high frequency signal, or whether a wireless power signal based on magnetic induction, which is a low frequency signal, is checked by transmitting a wireless power signal to the wireless power receiving apparatus through the selected power transmitting unit. Finally, by transmitting a wireless power signal according to the method checked, charging is made possible irrespective of whether the reception method for the wireless power receiving apparatus 1200 is based on magnetic induction or magnetic resonance.

At this time, the first object detection signal can be a pulse signal transmitted from a transmitting coil 121 of the inductive power transmitting unit 120. The second object detection signal can be a pulse signal transmitted from the antenna 131 of the magnetic resonant power transmitting unit 130. In other words, the first object detection signal is used to detect an external object by using inductive power while the second object detection signal is used to detect an external object by using resonant power.

The inductive power transmitting unit 120 and the magnetic resonant power transmitting unit 130 will be described in more detail with reference to FIGS. 2 and 3.

Figure 2:
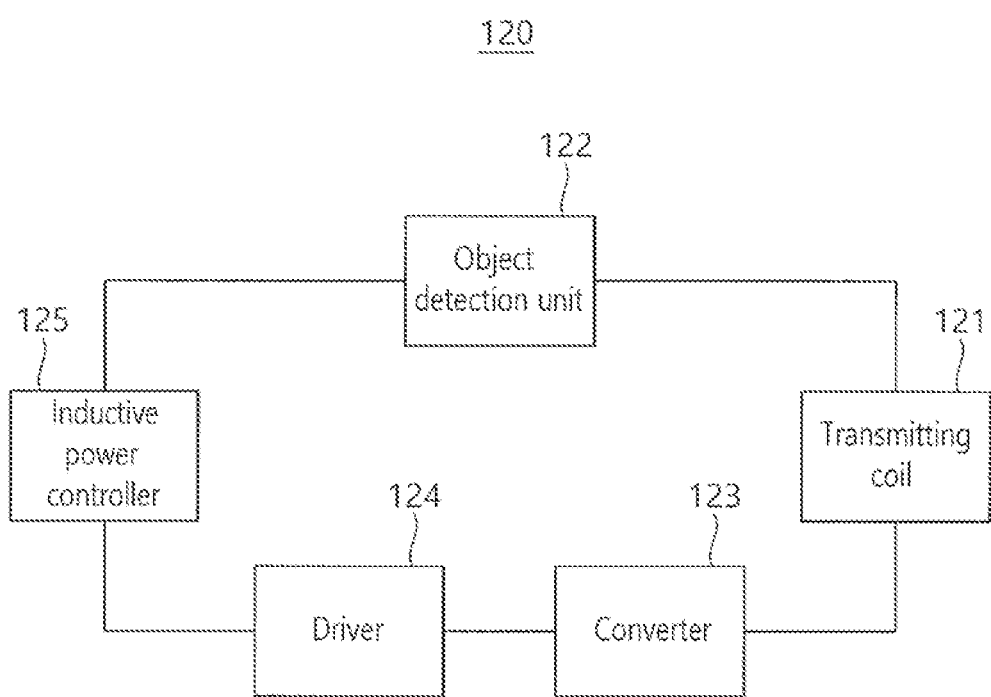
FIG. 2 is a block diagram illustrating an inductive power transmitting unit of a hybrid wireless power transmitting apparatus according to a first embodiment of the present disclosure.

FIG. 2 is a block diagram illustrating an inductive power transmitting unit 120 of a hybrid wireless power transmitting apparatus 1100 according to one embodiment of the present disclosure. As shown in the figure, the inductive power transmitting unit 120 can comprises a transmitting coil 121, an object detection unit 122, a converter 123, a driver 124, and an inductive power controller 125.

The transmitting coil 121 is a component for transmitting a wireless power signal based on magnetic induction, which transmits a wireless power signal to the inductive power receiving apparatus 1210 according to electromagnetic induction scheme. The transmitting coil 121 can take the form of a circle, ellipse, track, rectangle, or polygon. Also, according to one embodiment of the present disclosure, the first object detection signal is transmitted through the transmitting coil 121 under the control of the inductive power controller 125. In other words, the converter 123 and the driver 124 are controlled so that the first object detection signal is transmitted through the transmitting coil 121; if an inductive response signal is received through the transmitting coil 121 as the inductive power receiving apparatus 1210 is placed at a charging position, the object detection unit 122 detects the inductive response signal, by which an inductive wireless power signal is transmitted through the transmitting coil 121.

The converter 123 not only generates transmitting power used for generating a power signal to be transmitted according to the control of the driver 124 and provides the generated transmitting power to the transmitting coil 121 but also provides transmitting power used for generating the first object detection signal to the transmitting coil 121. In other words, if an inductive response signal is detected as the inductive power receiving apparatus 1210 is placed at a charging position, the inductive power controller 125 transmits a power control signal used to transmit a power signal having a power value required by the converter 123 to the driver 124, and accordingly, the driver 124 controls the operation of the converter 123 according to the transmitted power control signal. Accordingly, the converter applies transmitting power corresponding to the power value (namely voltage change, frequency change, or change of voltage and frequency) required by the control of the driver to the corresponding transmitting coil 121, by which a wireless power signal of the required strength is made to be transmitted to the inductive power receiving apparatus 1210 placed at the charging position.

The driver 124 controls the operation of the converter 123 through control of the inductive power controller 125.

The object detection unit 122 processes an inductive response signal from the inductive power receiving apparatus 1210 according to the first object detection signal output from the transmitting coil 121 and detects whether the inductive power receiving apparatus 1210 is placed at the charging position. Accordingly, the inductive power controller 125 transmits a digital ping signal (refer to FIG. 7: frequency change step signal; inductive resonant detection signal) through the transmitting coil 121 by controlling the driver 124 and receives a signal strength packet signal from the inductive power receiving apparatus 1210 in response to the digital ping signal, by which the inductive power controller can perform the function as an ID checking unit and perform the function of filtering and processing the charging state information (such as an amplitude-shift keying, ASK, communication signal transmitted from the wireless power receiving apparatus). In other words, if an inductive ID signal, which is a signal strength packet signal with respect to an inductive resonant detection signal transmitted through the transmitting coil 121, and a signal including charging state information are received, the inductive power controller performs the function of filtering and processing the received signals.

The inductive power controller 125 receives and checks the determination result of the object detection unit 122, analyzes an object response signal received from the transmitting coil 121, and transmits a power signal for transmitting a wireless power signal to the driver 124 through the transmitting coil 121.

In what follows, structure of a magnetic resonant power transmitting unit 130 of the hybrid wireless power transmitting apparatus 1110 according to one embodiment of the present disclosure will be described in detail with reference to FIG. 3.

Figure 3:
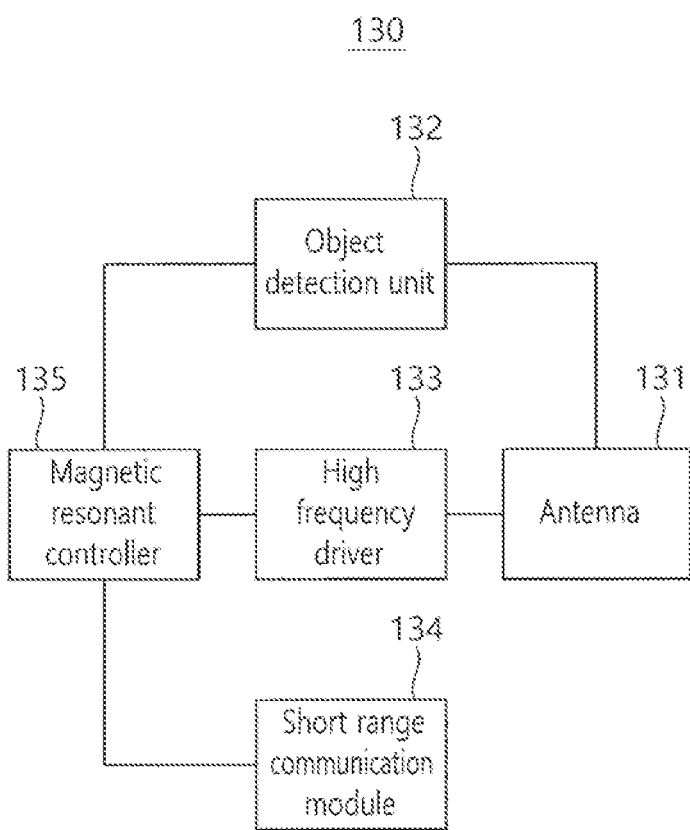
FIG. 3 is a block diagram illustrating a magnetic resonant power transmitting unit of a hybrid wireless power transmitting apparatus according to a first embodiment of the present disclosure.

FIG. 3 is a block diagram illustrating a magnetic resonant power transmitting unit 130 of a hybrid wireless power transmitting apparatus 1100 according to one embodiment of the present disclosure. As shown in FIG. 3, the magnetic resonant power transmitting unit 130 can comprise an antenna 131, object detection unit 132, high frequency driver 133, short range communication module 134, and magnetic resonant controller 135.

The antenna 131 is a component for transmitting a high frequency wireless power signal of 6.78 MHz±5%. To this purpose, a loop antenna 131 can be used and can be installed in the outer area of the transmitting coil 121 of the aforementioned inductive power transmitting unit 120. According to one embodiment of the present disclosure, a second object detection signal is transmitted through the antenna 131 under the control of the magnetic resonant controller 135. In other words, if a second object detection signal is transmitted through the antenna 131 and a resonant response signal (such as a frequency-shift keying, FSK, signal) is received through the antenna 131 as the magnetic resonant receiving apparatus 1220 is placed within a charging distance, the object detection unit 132 detects the resonant response signal, and accordingly the controller 110 selects the magnetic resonant power transmitting unit 130, after which the magnetic resonant controller 135 controls a magnetic wireless power signal to be transmitted through the antenna 131.

The object detection unit 132 processes a resonant response signal from the magnetic resonant receiving apparatus 1220 according to a second object detection signal output from the antenna 131 and detects whether the magnetic resonant receiving apparatus 1220 is located within a charging distance. According to the detection result, the magnetic resonant controller 135 transmits a digital ping signal (refer to FIG. 6: voltage change step signal; magnetic resonant detection signal) through the antenna 131 by controlling the high frequency driver 133 and performs the function of the ID checking unit by receiving a signal strength packet signal (magnetic ID signal) from the magnetic resonant receiving apparatus 1220 as a response signal with respect to the transmitted digital ping signal.

Meanwhile, the short range communication module 134 is a component for receiving charging state information from the magnetic resonant receiving apparatus 1220 while a magnetic resonant wireless power signal is being transmitted through the antenna 131. The magnetic resonant controller 135 changes the transmitting voltage by controlling the high frequency driver 133 according to the charging state information received through the short range communication module 134, thereby obtaining optimized wireless charging efficiency.

The magnetic resonant controller 135 receives and checks the determination result of the object detection unit, analyzes the FSK signal received through the antenna 131, transmits a power signal for transmitting a wireless power signal based on magnetic resonance to the high frequency driver 133 through the antenna 131, and controls the high frequency wireless power signal based on magnetic resonance to be transmitted through the antenna 131. Also, the magnetic resonant controller 135 can achieve optimized wireless charging efficiency by adjusting output voltage on the basis of the charging state information received in the middle of wireless charging through the short range communication module 134.

In what follows, a signal processing method for checking the type of the wireless power receiving apparatus 1200 of the hybrid wireless power transmitting apparatus 1100 above will be described with reference to FIGS. 4 and 5.

Figure 4:
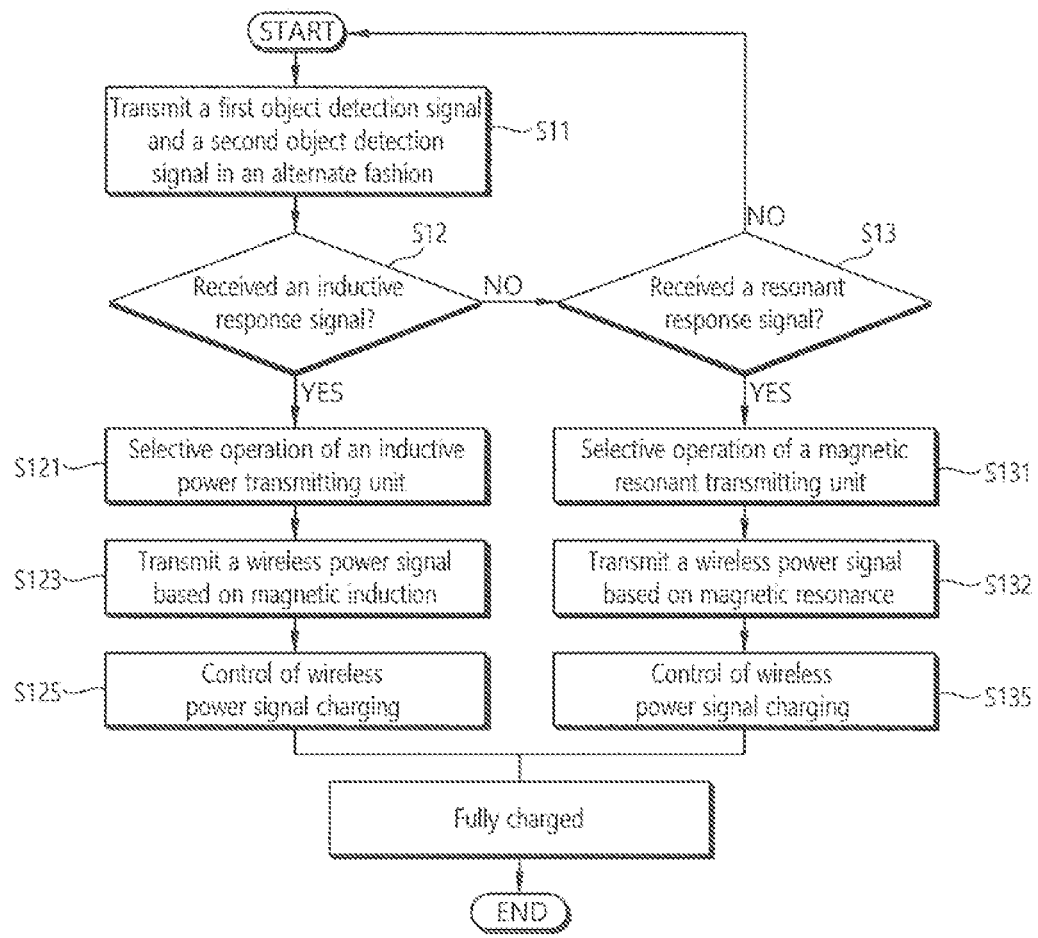
FIG. 4 is a flow diagram illustrating a signal processing method of a hybrid wireless power transmitting apparatus capable of transmitting wireless power signals based on magnetic resonance and magnetic induction according to a first embodiment of the present disclosure.

FIG. 4 is a flow diagram illustrating a signal processing method of a hybrid wireless power transmitting apparatus capable of transmitting wireless power signals based on magnetic resonance and magnetic induction according to one embodiment of the present disclosure.

First, the controller 110 controls the inductive power transmitting unit 120 and the magnetic resonant controller 135 so that a first object detection signal is transmitted through the inductive power transmitting unit 120 and a second object detection signal is transmitted through the magnetic resonant power transmitting unit 130. At this time, the first object detection signal and the second object detection signal are transmitted in an alternate fashion S11.

Next, the controller 110 checks whether the inductive power transmitting unit 120 has received an inductive response signal S12. At this time, if an inductive response signal is not received, the controller 110 checks whether a magnetic response signal has been received S13. The inductive response signal is an ASK signal coming from the inductive power receiving apparatus 1210, and the resonant response signal is an FSK signal coming from the wireless power receiving apparatus based on magnetic resonance. Meanwhile, it should be understood that the order of performing the S12 and S13 steps can be changed.

In case an inductive response signal is received, the controller 110 selects and operates the inductive power transmitting unit 120, S121 and then transmits a wireless power signal based on magnetic induction through the transmitting coil 121, S123. Accordingly, the wireless receiving apparatus (an inductive power receiving apparatus 1210) is charged by the wireless power signal based on magnetic induction, receives state information from the inductive power receiving apparatus 1210 through the transmitting coil 121, thereby realizing wireless power control and obtaining optimized wireless charging S125.

If a resonant response signal is received while an inductive response signal is not received, the controller 110 selects and operates the magnetic resonant power transmitting unit 130, S131 and then transmits a wireless power signal based on magnetic resonance through the antenna 131, S133. Accordingly, the wireless receiving apparatus (a magnetic resonant receiving apparatus 1220) is charged by the wireless power signal based on magnetic resonance, receives state information from the magnetic resonant receiving apparatus 1220 through the short range communication module 134, thereby realizing wireless power control and obtaining optimized wireless charging S135.

In what follows, a signal processing method for the case where a wireless power receiving apparatus is a hybrid wireless power receiving apparatus 1230 capable of receiving both of a wireless power signal based on magnetic resonance and a wireless power signal based on magnetic induction will be described with reference to FIG. 5.

Figure 5:
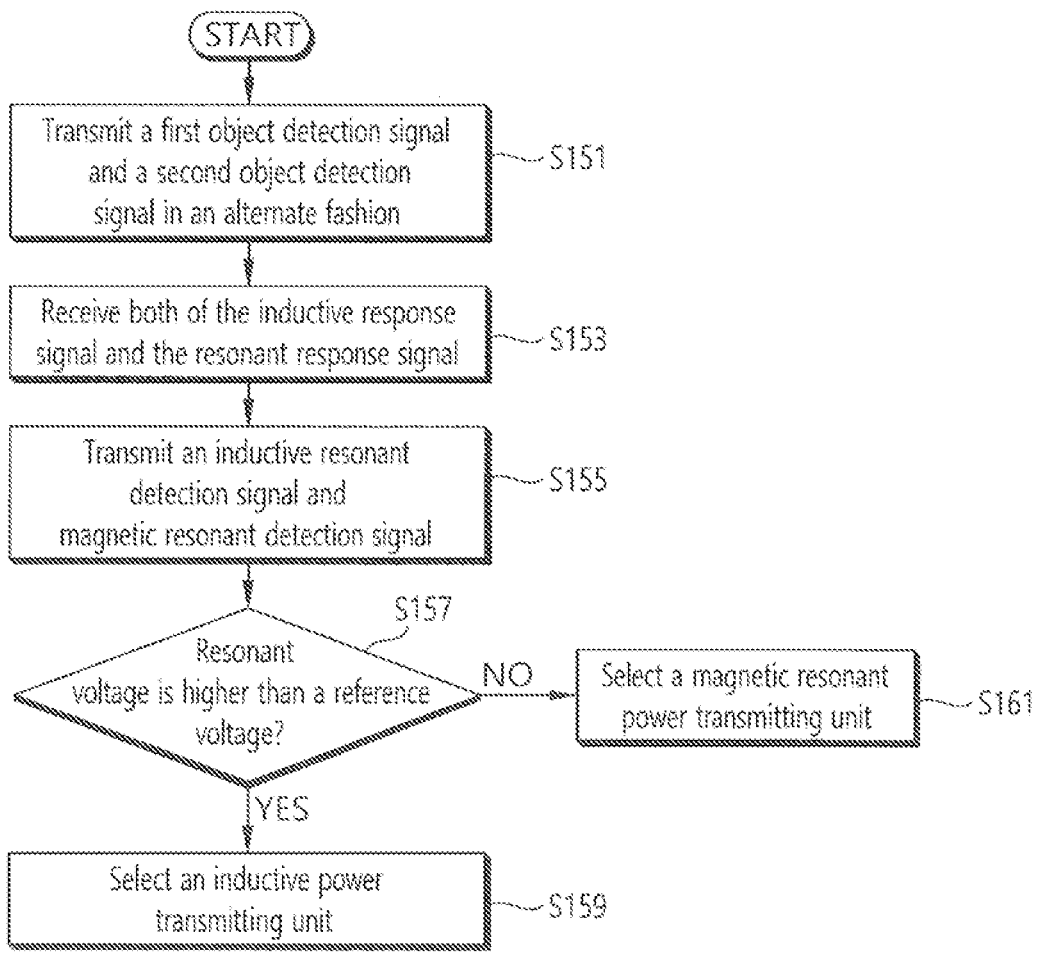
FIG. 5 is a flow diagram illustrating a signal processing method for the case where a hybrid wireless power transmitting apparatus capable of transmitting a wireless power signal based on magnetic resonance and a wireless power signal based on magnetic induction according to a first embodiment of the present disclosure receives an inductive response signal and a resonant response signal simultaneously.

FIG. 5 is a flow diagram illustrating a signal processing method for the case where a hybrid wireless power transmitting apparatus 1100 capable of transmitting a wireless power signal based on magnetic resonance and a wireless power signal based on magnetic induction according to one embodiment of the present disclosure receives an inductive response signal and a resonant response signal simultaneously (namely for the case where the wireless power receiving apparatus 1200 is the hybrid wireless power receiving apparatus 1230).

First, in the same way as in FIG. 4, the controller 110 controls the inductive power transmitting unit 120 and the magnetic resonant power transmitting unit 130 so that a first object detection signal can be transmitted through the inductive power transmitting unit 120 and a second object detection signal can be transmitted through the magnetic resonant power transmitting unit 130. At this time, the first object detection signal and the second object detection signal are transmitted in an alternate fashion S151. At this time, if the wireless power receiving apparatus 1200 located within a charging distance is a hybrid wireless power receiving apparatus 1230, both of an inductive response signal and a resonant response signal can be received S153. Then the controller controls both of the inductive power transmitting unit 120 and the magnetic resonant power transmitting unit 130 to transmit an inductive resonant detection signal and a magnetic resonant detection signal to the wireless power receiving apparatus S155. At this time, if resonant frequency of the inductive frequency information (which is transmitted from the inductive power receiving apparatus) corresponding to the inductive resonant detection signal lies beyond a predetermined range from a reference frequency and the resonant voltage of the resonant voltage information (which is transmitted from the resonant power receiving apparatus) corresponding to the magnetic resonant detection signal is smaller than a reference voltage, the controller selects and operates the magnetic resonant power transmitting unit 130, whereas, if the resonant frequency from among the inductive resonant detection signals falls within a predetermined range from the reference frame and the resonant voltage of the magnetic resonant detection signal is higher than the reference voltage, the controller selects and operates the inductive power transmitting unit 120, S157, S159, S161. In other words, If the resonant frequency falls within a predetermined range from the reference frequency and the resonant voltage is higher than the reference voltage, induction-based methods become more efficient than the magnetic resonance-based methods. This is so because that the resonant frequency falls within a predetermined range from the reference frequency indicates that the wireless power receiving apparatus 1200 is located very close to an optimal charging position among various charging positions, and that the resonant voltage of the magnetic resonant detection signal is higher than the reference voltage indicates that the wireless power receiving apparatus 1200 is located within a charging distance separated by a predetermined distance from an optimal charging distance. Therefore, if the resonant frequency falls within a predetermined range from the reference frequency and the resonant voltage is higher than the reference voltage, induction-based methods become more advantageous, whereas, if the inductive resonant frequency lies beyond a predetermined range from the reference frequency and the resonant voltage is smaller than the reference voltage, resonance-based methods become more advantageous.

Figure 6:
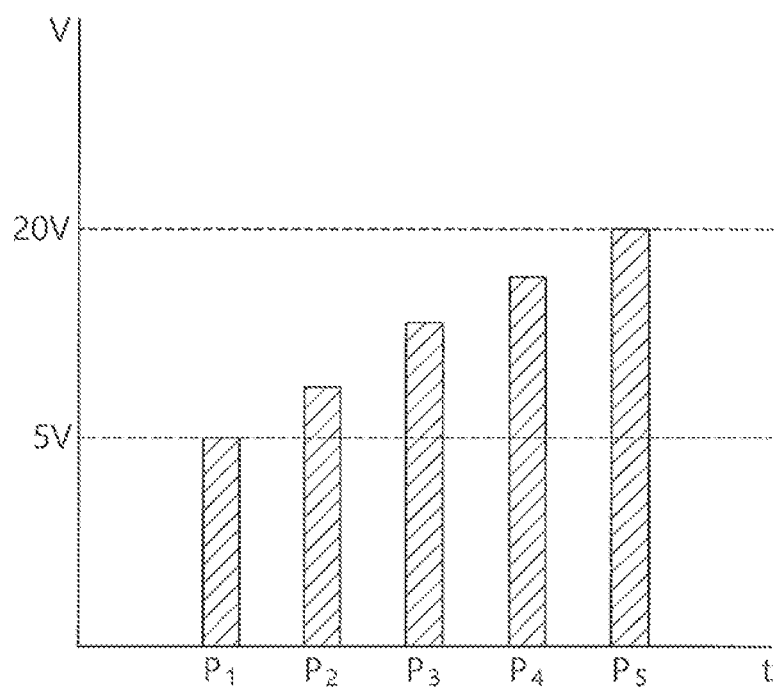
FIG. 6 illustrates an example of a magnetic resonant detection signal transmitted by a signal processing method for a hybrid wireless power transmitting apparatus capable of transmitting a magnetic resonant wireless power signal and an inductive wireless power signal according to a first embodiment of the present disclosure.

FIG. 6 illustrates an example of a magnetic resonant detection signal transmitted by a signal processing method for a hybrid wireless power transmitting apparatus capable of transmitting a magnetic resonant wireless power signal and an inductive wireless power signal according to one embodiment of the present disclosure.

As shown in FIG. 6, a magnetic resonant detection signal is a voltage change step signal at a particular frequency (magnetic resonant frequency). In other words, the magnetic resonant detection signal is a voltage change step signal changing gradually over 5 to 20 V in the resonant frequency range of 6.78 MHz±5%. If the magnetic resonant power transmitting unit 130 receives a resonant response signal corresponding to a second object detection signal from a wireless power receiving apparatus, namely magnetic resonant receiving apparatus 1220, the magnetic resonant power transmitting unit 130 transmits a voltage change step signal, which is a digital ping signal as shown in FIG. 6, through the antenna 131. Accordingly, the magnetic resonant receiving apparatus 1220 transmits an FSK communication signal (which corresponds to resonant voltage information) with respect to the signal corresponding to an optimal voltage, according to which an optimal voltage is selected.

At this time, if the FSK signal is received at P1, it indicates that a charging distance is optimal. On the other hand, if the FSK signal is received at P5, it indicates that the corresponding charging position is located either at the farthest position or closest position of the charging distance, which corresponds to the worst charging efficiency though charging is possible at those positions.

Figure 7:
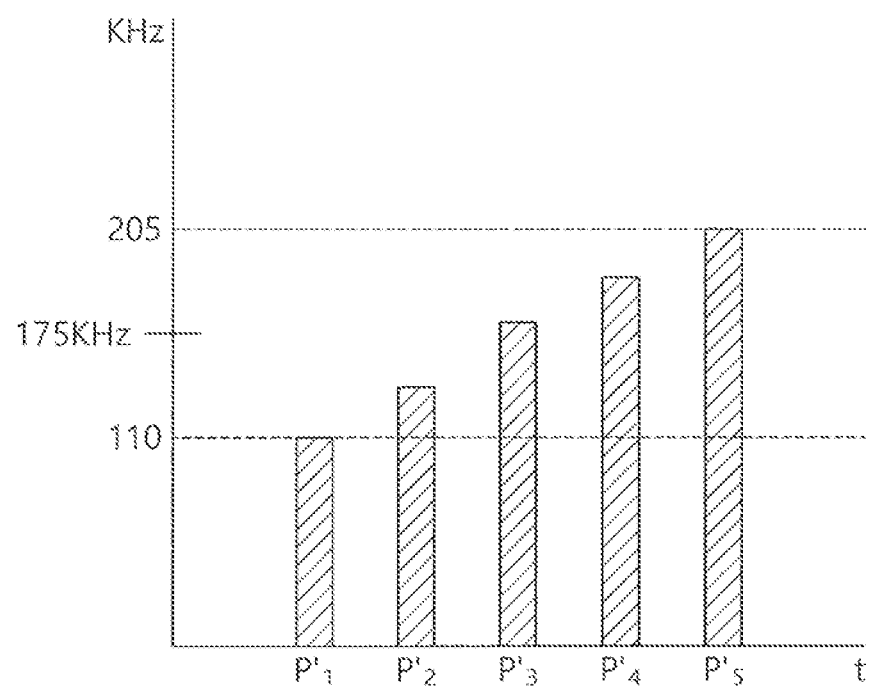
FIG. 7 illustrates an example of an inductive resonant detection signal transmitted by a signal processing method for a hybrid wireless power transmitting apparatus capable of transmitting a magnetic resonant wireless power signal and an inductive wireless power signal according to a first embodiment of the present disclosure.

FIG. 7 illustrates an example of an inductive resonant detection signal transmitted by a signal processing method for a hybrid wireless power transmitting apparatus capable of transmitting a magnetic resonant wireless power signal and an inductive wireless power signal according to one embodiment of the present disclosure.

As shown in FIG. 7, an inductive resonant detection signal is a frequency change step signal. In other words, the inductive resonant detection signal is a frequency change step signal changing gradually by a predetermined frequency step within a frequency band ranging from 110 to 205 kHz. If the inductive power transmitting unit 120 receives an inductive response signal corresponding to a first object detection signal from a wireless power receiving apparatus, namely inductive power receiving apparatus 1210, the inductive power transmitting unit 120 transmits a frequency change step signal, which is a digital ping signal as shown in FIG. 7, through the transmitting coil 121. Accordingly, the inductive power receiving apparatus 1210 transmits an ASK communication signal (which corresponds to inductive frequency information) with respect to the signal corresponding to an optimal frequency (which corresponds to one of P'1 to P'5), according to which an optimal frequency is selected.

At this time, if the ASK signal is received at P'3 which corresponds to the optimal frequency 175 kHz, it indicates that a charging position is optimal. On the other hand, if the ASK signal is received at P'1 or P'5, it indicates that the corresponding charging position gives the worst charging efficiency.

According to one embodiment of the present disclosure above, type of a wireless power receiving apparatus can be checked through an antenna and a transmitting coil, according to which charging of a wireless power receiving apparatus based on magnetic induction and a wireless power receiving apparatus based on magnetic resonance can be performed by transmitting a wireless power signal according to an appropriate method.

Also, if the wireless power receiving apparatus is a hybrid type, a wireless power signal with improved transmission efficiency can be transmitted.

Also, since the type of a wireless power receiving apparatus can be checked without using a separate communication unit or detection sensor, the number of components can be reduced, and manufacturing costs can be reduced.

Second Embodiment

Figure 8:
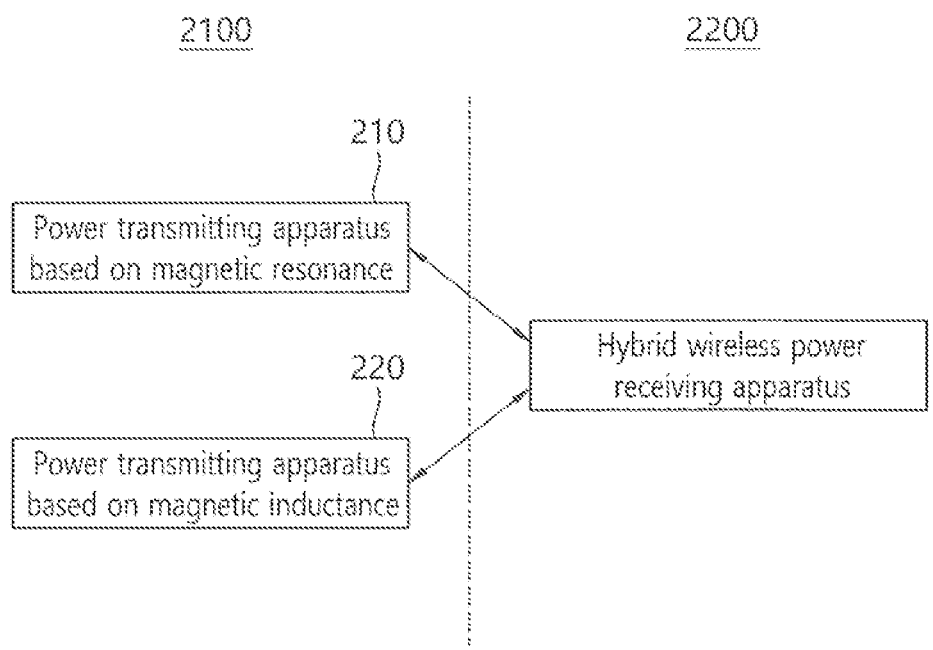
FIG. 8 is a block diagram illustrating operation of a wireless power transmitting system including a hybrid wireless power receiving apparatus according to a second embodiment of the present disclosure.

FIG. 8 is a block diagram illustrating operation of a wireless power transmitting system including a hybrid wireless power receiving apparatus according to a second embodiment of the present disclosure. As shown in FIG. 8, a wireless power system according to the present disclosure can comprise a wireless power transmitting apparatus 2100 and a wireless power receiving apparatus 2200.

A hybrid wireless power receiving apparatus 2200 according to the present disclosure can receive power signals (inductive power signal and resonant power signal) from both of the wireless power transmitting apparatus based on magnetic induction and the wireless power transmitting apparatus based on magnetic resonance.

More specifically, an inductive power signal coming from the inductive power transmitting apparatus 220 is received through a receiving coil 2211 of the receiving block (refer to FIG. 9), and a resonant power signal coming from the resonant power transmitting apparatus 210 is received through a loop antenna 2213 installed around the receiving coil 2211.

Accordingly, the hybrid wireless power receiving apparatus 2200 according to the present disclosure can receive both of the inductive power signal and resonant power signal and provide power to the load by using the received power signals.

In what follows, structure of the hybrid wireless power receiving apparatus will be described in detail with reference to FIG. 8.

Figure 9:
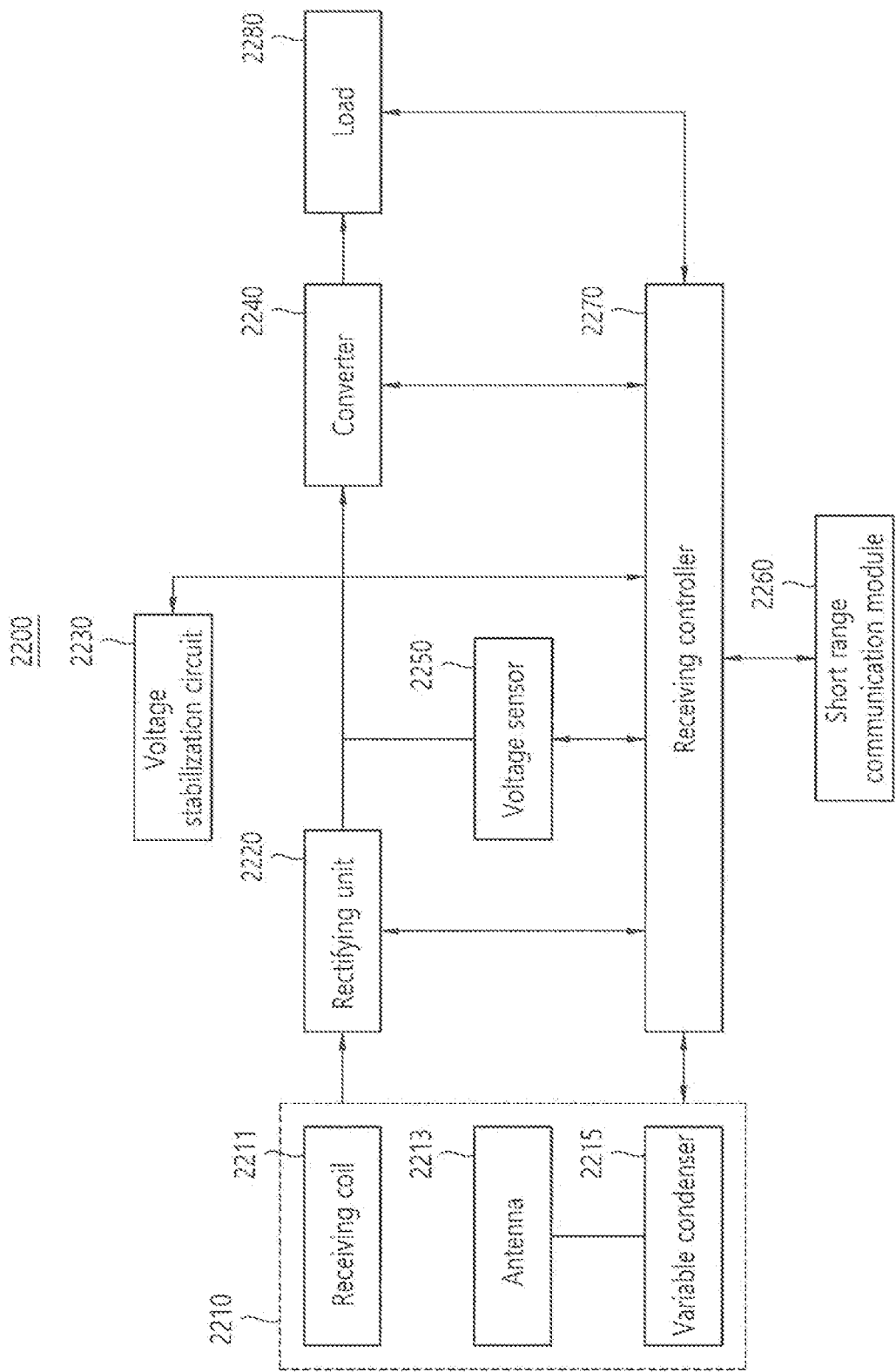
FIG. 9 is a block diagram illustrating an electrical structure of a hybrid wireless power receiving apparatus according to a second embodiment of the present disclosure.

FIG. 9 is a block diagram illustrating an electrical structure of a hybrid wireless power receiving apparatus according to a second embodiment of the present disclosure. As shown in FIG. 9, a hybrid wireless power receiving apparatus 2200 according to the present disclosure can comprise a receiving block 2210, rectifying unit 2220, voltage stabilization circuit 2230, converter 2240, voltage sensor 2250, short range communication module 2260, receiving controller 2270, and load 2280.

The receiving block 2210 is a component used for receiving a wireless power signal and as shown in FIG. 9, comprises a receiving coil 2211, antenna 2213, and a variable condenser 2215 connected to the antenna 2213.

The receiving coil 2211 is used for receiving an inductive power signal when the wireless power transmitting apparatus 2100 is an inductive power transmitting apparatus 220 that transmits the inductive power signal. The receiving coil 2211 performs the function of generating AC (Alternating Current) power from a power signal in the low frequency band ranging typically from 100 to 205 kHz according to electromagnetic induction.

The antenna 2213 is used for receiving a resonant power signal when the wireless power transmitting apparatus 2100 transmits a resonant power signal. The antenna 2213 performs the function of generating AC power from a power signal at the high frequency typically at 6.78 MHz±5% according to magnetic resonance.

The variable condenser 2215, if recognizing a resonant power transmitting apparatus 210 through the antenna 2213, performs the role of separating the resonant frequency of the antenna 2213. In other words, the receiving controller 2270 can receive a resonant power signal at a receiving frequency separated from the resonant frequency by adjusting the variable condenser 2215.

Figure 10:
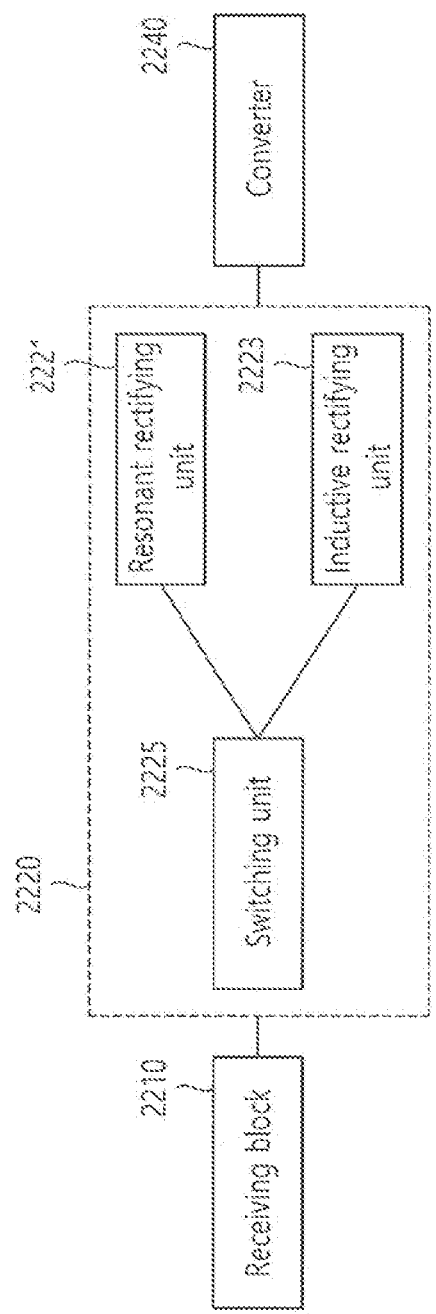
FIG. 10 is a block diagram illustrating an electrical structure of a rectifying unit of a hybrid wireless power receiving apparatus according to a second embodiment of the present disclosure.

The rectifying unit 2220 performs the function of rectifying AC power received from the receiving block 2210 to DC (Direct Current) power. In other words, the rectifying unit performs the function of generating rectified power by rectifying AC power at the antenna 2213 generated by AC power or resonant power signal at the receiving coil 2211 generated by the inductive power signal. FIG. 10 gives more detailed descriptions of the structure of the rectifying unit 2220.

The voltage stabilization circuit 2230, being located between the rectifying unit 2220 and the converter 2240, performs the function of stabilizing voltage of power flowing into the converter 2240 by applying a virtual load in case the initial wireless power signal is received.

The voltage sensor 2250, being located between the rectifying unit 2220 and the converter 2240, performs the function of measuring voltage of rectified power generated by a wireless power signal. In other words, the receiving controller 2270 can check whether the power flowing into the converter 2240 is within a normal operating range through the voltage of rectified power received through the voltage sensor 2250.

The converter 2240 performs the role of converting rectified power to the power required for the load 2280.

The short range communication module 2260 performs the role of transmitting charging state information of the load 2280 to facilitate power supply to the load 2280 when the wireless power transmitting apparatus 2100 is based on magnetic resonance, receives a resonant power signal, and provides power to the load 2280 according to the received resonant power signal. For the case of inductive wireless power transmitting apparatus, the short range communication module 2260 transmits the charging state information of the load 2280 according to ASK communication through the receiving coil 2211.

The receiving controller 2270 performs the function of supplying the rectified power to the voltage stabilization circuit 2230 if the resonant power signal and the inductive power signal are received at the initial stage and providing the rectified power to the converter 2240 after turning off the voltage stabilization circuit 2230 if it is determined that the rectified power rectified by the resonant power signal and the inductive power signal belongs to a reference operating range. Also, the receiving controller 2270 performs the function of receiving the resonant power receiving signal at the resonant frequency by re-adjusting the variable condenser 2215 after a reference time period elapses since reception of the initial resonant power signal.

Also, the receiving controller 2270 receives voltage information signal measured by the voltage sensor 2250. If the measured voltage value of the voltage information signal lies within a reference range, the receiving controller 2270 determines that power can be supplied normally to the load 2280, turns off the voltage stabilization circuit 2230, and supplies the rectified power to the converter 2240. The operation of the receiving controller 2270 above and the overall power receiving operation of the hybrid wireless power receiving apparatus 2200 will be described in more detail with reference to FIG. 12.

In what follows, a specific structure of the rectifying unit 2220 of the hybrid wireless power receiving apparatus 2200 will be described in more detail with reference to FIG. 10.

FIG. 10 is a block diagram illustrating an electrical structure of a rectifying unit of a hybrid wireless power receiving apparatus according to a second embodiment of the present disclosure.

As described above, the rectifying unit 2220 performs the function of converting AC power to DC power by rectifying AC power generated in the receiving block 2210. The rectifying unit 2220 can comprise a resonant rectifying unit 2221 rectifying power generated by the resonant power signal from the resonant power transmitting apparatus 210, an inductive rectifying unit 2223 rectifying power generated by the inductive power signal from the inductive power transmitting apparatus 220, and a switching unit 2225 selecting one of the resonant rectifying unit 2221 and the inductive rectifying unit 2223.

In other words, after checking the type of the wireless power transmitting apparatus 2100 transmitting a wireless power signal, the receiving controller 2270 controls the switching unit 2225 to select one of the rectifying units corresponding to the type of the wireless power transmitting apparatus and performs rectification. By performing rectification according to the two-channel scheme described above, not only the rectification efficiency is improved but also current leakage to the receiving block 2210 which does not receive a wireless power signal is prevented, leading to improvement of power transmission efficiency.

In what follows, an example where functions of a hybrid wireless power receiving apparatus according to a second embodiment of the present disclosure are applied to a magnetic resonant wireless power receiving apparatus will be described in more detail with reference to FIG. 11.

Figure 11:
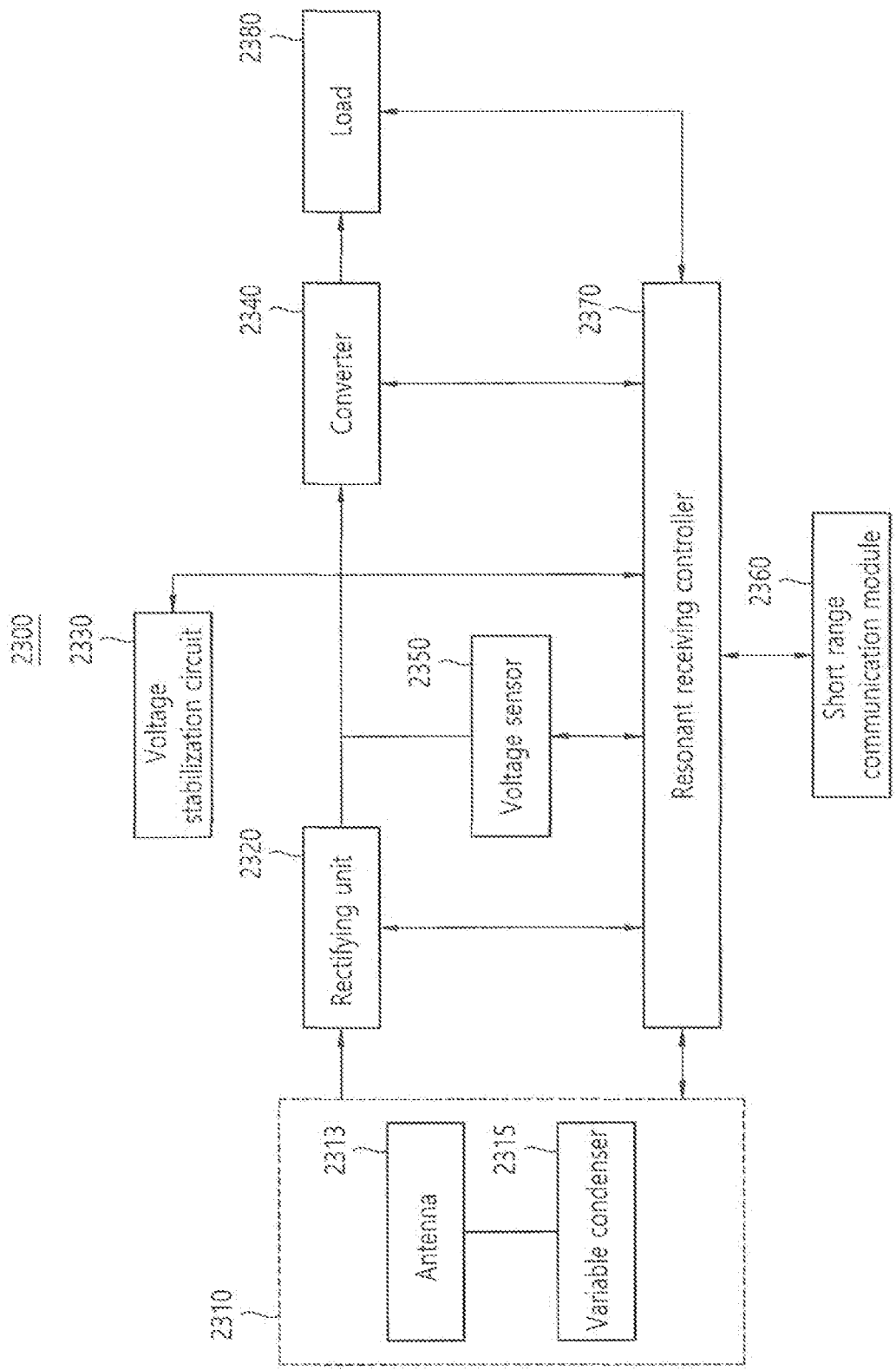
FIG. 11 is a block diagram illustrating an electrical structure of a magnetic resonant wireless power receiving apparatus according to another embodiment of the second embodiment of the present disclosure.

FIG. 11 is a block diagram illustrating an electrical structure of a magnetic resonant wireless power receiving apparatus according to another embodiment of the second embodiment of the present disclosure. As shown in FIG. 11, the magnetic resonant wireless power receiving apparatus 2300 can comprise a receiving block 2310 including an antenna 2313 and a variable condenser 2315, rectifying unit 2320, voltage stabilization circuit 2330, converter 2340, voltage sensor 2350, short range communication module 2360, resonant receiving controller 2370, and load 2380.

At this time, since the rectifying unit 2320, voltage stabilization circuit 2330, converter 2340, voltage sensor 2350, short range communication module 2360, and load 2380 perform the same functions as the components of FIG. 10 with the same names, descriptions related thereto will be omitted.

Different from the receiving block 2210 of FIG. 9, the receiving block 2310 of the magnetic resonant wireless power receiving apparatus 2300 of FIG. 11 comprises an antenna 2313 and a variable condenser 2315 only. The resonant receiving controller 2370, recognizing the magnetic resonant wireless power transmitting apparatus through the antenna 2313, adjusts the variable condenser 2315 to receive the initial resonant power signal at a receiving frequency separated from the resonant frequency. In other words, since the resonant power signal is received at a separated receiving frequency rather than the resonant frequency at the time of receiving the initial power, a surge voltage can be prevented from being generated. Also, the resonant receiving controller 2370 re-adjusts the variable condenser 2315 after a reference time period is passed from since the initial resonant power signal is received so that the resonant power signal can be received at the resonant frequency, by which charging can be performed in an optimal manner after the surge voltage is prevented.

In what follows, a method for controlling a wireless power signal in a hybrid wireless power receiving apparatus having the structure described above in FIGS. 9 and 10 will be described in detail with reference to FIG. 12. It should be understood that a method for controlling a wireless power signal of FIG. 12 can also be applied to the magnetic resonant wireless power receiving apparatus of FIG. 11.

Figure 12:
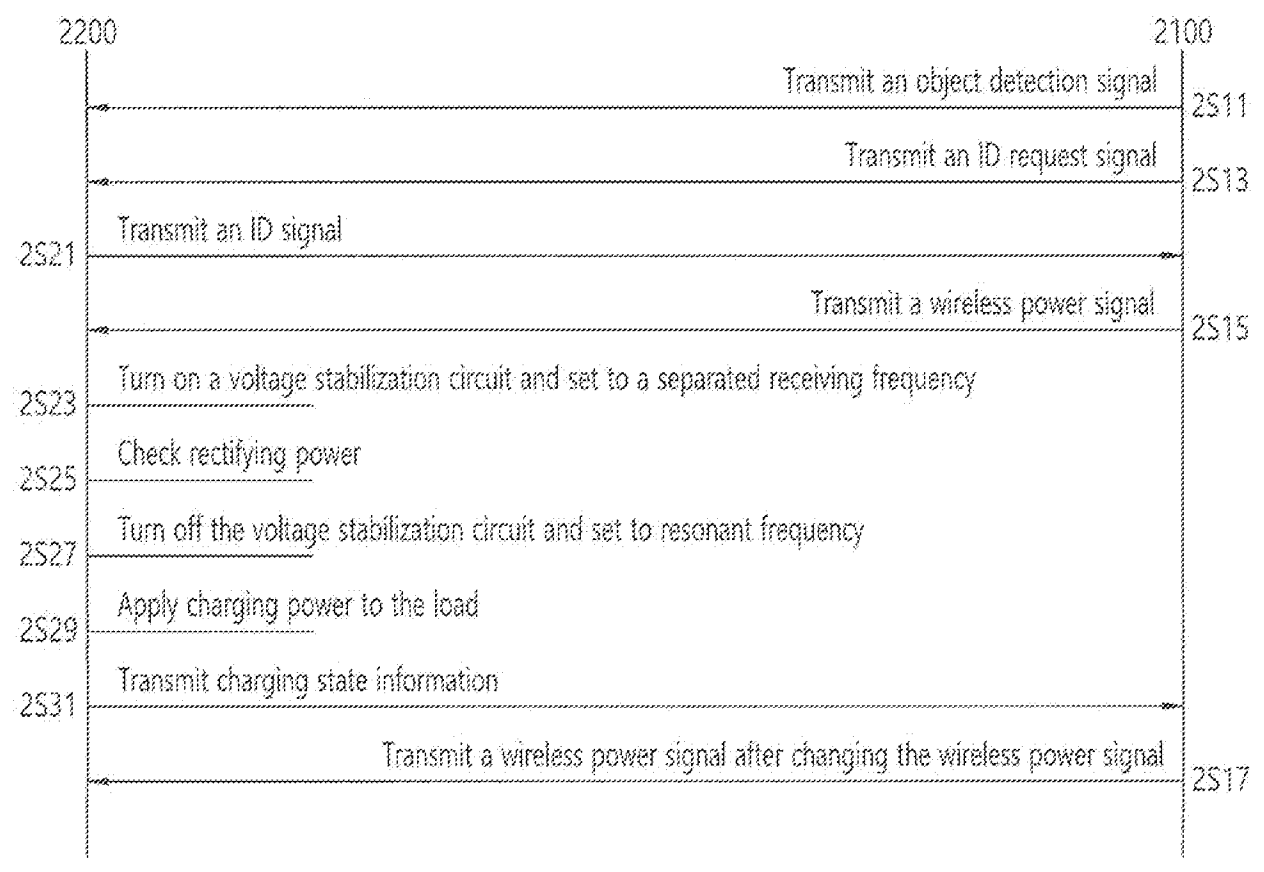

FIG. 12 is a flow diagram illustrating a wireless power transmission control method according to a hybrid wireless power receiving apparatus according to a second embodiment of the present disclosure. As shown in FIG. 11, if the hybrid wireless power receiving apparatus 2200 is located within a charging distance (resonance-type) or at a charging position (induction-type), the wireless power transmitting apparatus 2100 checks by using an object detection signal whether an external object is detected. At this time, in case the wireless power transmitting apparatus 2100 is an induction-type, the wireless power transmitting apparatus checks by using a pulse signal at the transmitting coil whether an external object is an inductive power transmitting apparatus 220. In other words, in case the external object is an inductive power transmitting apparatus 220, the wireless power receiving apparatus 2200 transmits an ASK communication signal through the receiving coil 2211, according to which the wireless power transmitting apparatus 2100 transmits an ID request signal through the transmitting coil.

In case the wireless power transmitting apparatus 2100 is an induction-type, the wireless power transmitting apparatus can check by using a pulse signal at the antenna 2213 whether an external object is a resonant power transmitting apparatus 210. If the external object is found to be a resonant power transmitting apparatus 210, the wireless power transmitting apparatus 2100 transmits an ID request signal to the wireless power receiving apparatus 2200 through the short range communication module 2260, S213.

Then, the wireless power receiving apparatus 2200 transmits the ID signal to the receiving coil 2211 (in the case of induction-type) or short range communication module 2260 (in the case of resonance-type) S221. Then the wireless power transmitting apparatus 2100 transmits a wireless power signal according to the ID signal. In other words, the hybrid wireless power receiving apparatus 2200, if receiving initially one of the resonant power signal coming from the resonant power transmitting apparatus 210 and the wireless power signal of the inductive power transmitting apparatus 220, turns on the voltage stabilization circuit 2230 located in the rear end of the rectifying unit 2220. In case the power signal corresponds to the resonant power signal, the hybrid wireless power receiving apparatus 2200 receives the initial resonant power signal by configuring the initial resonant power signal to be at a receiving frequency separated from the resonant frequency by adjusting the variable condenser 2215 connected to the antenna 2213, S223.

Next, the receiving controller 2270 checks the voltage of rectified power measured between the rectifying unit 2220 and the converter 2240 through the voltage sensor 2250, S225. If it is determined that the checked rectified voltage is within a normal operating range, the receiving controller 2270 turns off the voltage stabilization circuit 2230 and re-adjusts the variable condenser 2215 to receive a resonant signal at the resonant frequency S227. Meanwhile, in the case of induction-type, if it is determined that the rectified power rectified by an inductive power signal is within a reference range, the receiving controller 2270 turns off the voltage stabilization circuit 2230 and provides the rectified power to the converter 2240. Likewise, after a reference time period is passed since the initial resonant power signal is received, the receiving controller 2270 can re-adjust the variable condenser 2215 to receive the resonant power receiving signal at the resonant frequency without checking the voltage of the rectified power before rectification.

In this way, the receiving controller 2270 re-adjusts the variable condenser 2215 and the antenna 2213 receives the resonant power signal at the resonant frequency by. And accordingly, the wireless power receiving apparatus 2200 continues charging by applying rectified power to the load 2280, S229. At this time, the receiving controller 2270 of the wireless power receiving apparatus 2200 generates charging state information and transmits the generated charging state information to the wireless power transmitting apparatus through the short range communication module 2260. And the wireless power transmitting apparatus 2100 changes the frequency or strength of the wireless power signal to have the optimal transmission efficiency and transmits the changed wireless power signal S231, S217.

According to the second embodiment of the present disclosure above, since charging can be performed by receiving both of an inductive power signal and a resonant power signal irrespective of the type of a transmitting apparatus, compatibility among apparatus is improved.

Also, according to the second embodiment of the present disclosure, an abrupt voltage rise out of a reference range which can occur at the initial charging step can be prevented, which contributes to improvement of durability of related products.

Third Embodiment

Figure 13:
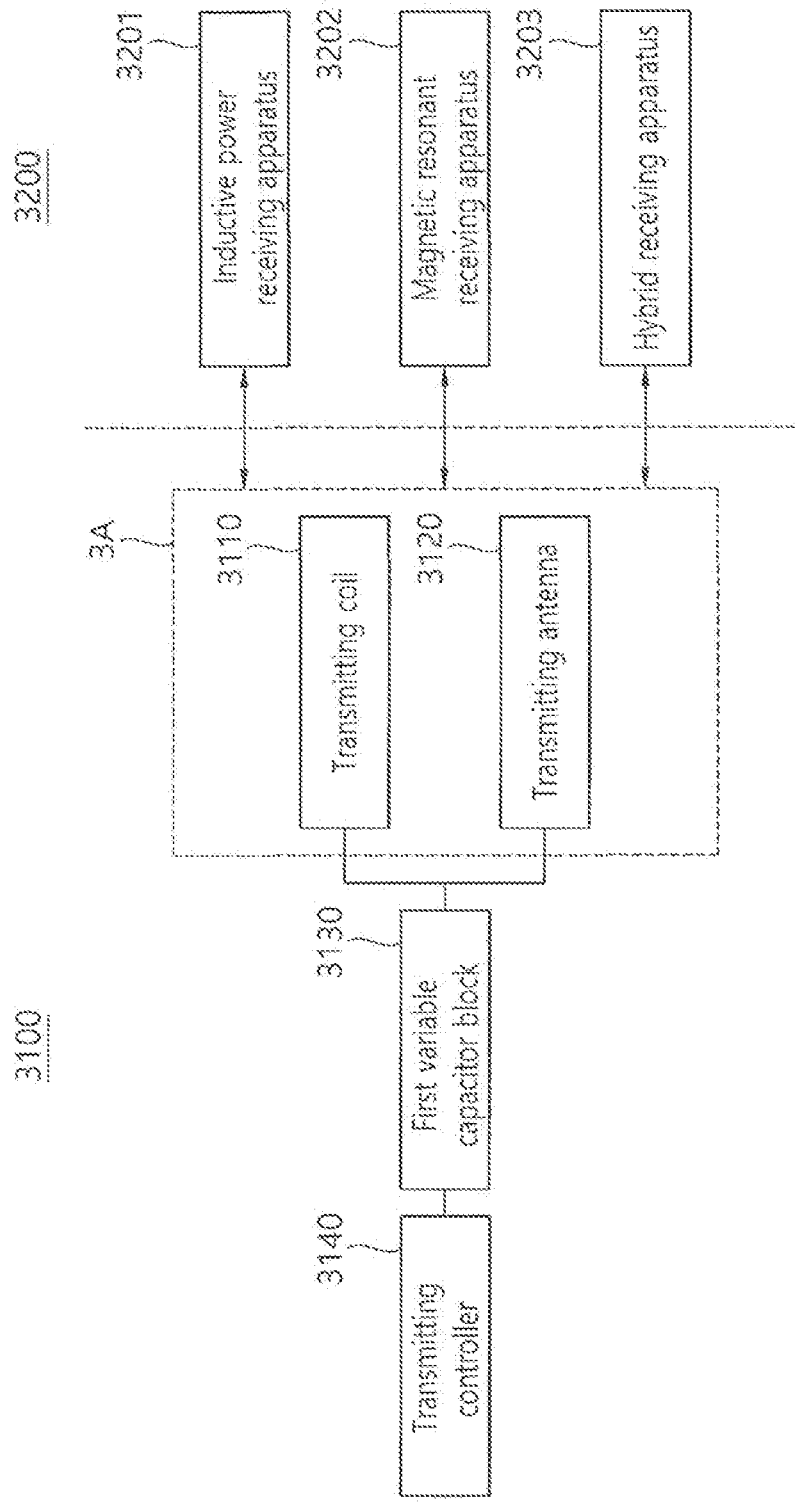
FIG. 13 is a block diagram illustrating an electrical structure of a wireless power transmitting system capable of transmitting and receiving an inductive power signal and a resonant power signal according to a third embodiment of the present disclosure.

FIG. 13 is a block diagram illustrating an electrical structure of a wireless power transmitting system capable of transmitting and receiving an inductive power signal and a resonant power signal according to a third embodiment of the present disclosure. As shown in FIG. 13, a wireless power system according to the present disclosure can comprise a wireless power transmitting apparatus 3100 and a wireless power receiving apparatus 3200.

A hybrid wireless power transmitting apparatus 3100 according to the present disclosure comprises a transmitting coil 3110, transmitting antenna 3120, first variable capacitor block 3130, and transmitting controller 3140, where an inductive power receiving apparatus 3201, magnetic resonant receiving apparatus 3202, and hybrid receiving apparatus 3203 can be used as the wireless power receiving apparatus 3200.

More specifically, the transmitting coil 3110 is used for transmitting an inductive power signal from a wireless power signal due to electromagnetic induction while the transmitting antenna 3120 is used for transmitting a resonant power signal which is a wireless power signal due to the magnetic resonance phenomenon.

The first variable capacitor block 3130 connected to the transmitting coil 3110 and the transmitting antenna 3120 is used to perform inductive main impedance matching or resonant main impedance matching with the transmitting coil and the transmitting antenna when the wireless power receiving apparatus 3200 is located at a charging position (in the case of an inductive power receiving apparatus) or within a charging distance (in the case of a magnetic resonant receiving apparatus).

If an inductive power receiving apparatus is located at a charging position, the transmitting controller 3140 not only operates the transmitting coil 3110 but also performs inductive main impedance matching by controlling the first variable capacitor block 3130. If a magnetic resonant receiving apparatus is located within a charging distance, the transmitting controller 3140 not only operates the transmitting antenna 3120 but also performs resonant main impedance matching by controlling the first variable capacitor block 3130.

At this time, main impedance matching corresponds to auxiliary impedance matching carried out in the wireless power receiving apparatus 3200, which indicates that a relatively large change of capacitance is carried out during impedance matching. Also, auxiliary impedance matching indicates a relatively small change of capacitance carried out during impedance matching between a second variable capacitor block 3230 of the wireless power receiving apparatus 3200 and the transmitting block 3A of the wireless power transmitting apparatus 3100.

As the wireless power transmitting apparatus 3100 is configured as described above, if the wireless power receiving apparatus 3200 is an inductive power receiving apparatus 3201, the first variable capacitor block 3130 is made to carry out inductive main impedance matching while, if the wireless power receiving apparatus 3200 is a magnetic resonant receiving apparatus 3202, the first variable capacitor block 3130 is made to carry out resonant main impedance matching.

According to the third embodiment of the present disclosure described above, charging is made possible irrespective of whether the receiving apparatus is a resonance-type or an induction-type. Moreover, since impedance matching with the receiving apparatus is carried out by both of the transmitting and receiving apparatus, burden of the impedance matching on the transmitting apparatus can be reduced.

In what follows, an electrical structure of a hybrid receiving apparatus in a wireless power transmitting system capable of transmitting and receiving an inductive power signal and resonant power signal according to the third embodiment of the present disclosure will be described with reference to FIG. 14.

Figure 14:
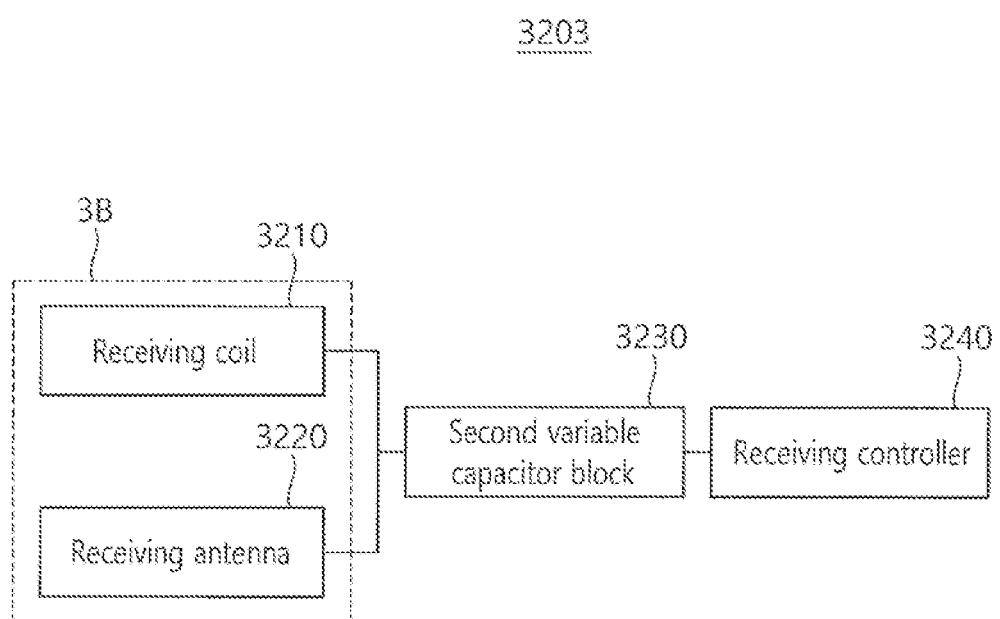
FIG. 14 is a block diagram illustrating an electrical structure of a hybrid receiving apparatus of a wireless power transmitting system capable of transmitting and receiving an inductive power signal and a resonant power signal according to a third embodiment of the present disclosure.

FIG. 14 is a block diagram illustrating an electrical structure of a hybrid receiving apparatus of a wireless power transmitting system capable of transmitting and receiving an inductive power signal and a resonant power signal according to a third embodiment of the present disclosure. As shown in FIG. 14, the hybrid receiving apparatus 3203 can comprise a receiving block 3B, second variable capacitor block 3230, and receiving controller 3240.

The receiving block 3B can comprise a receiving coil 3210 and a receiving antenna 3220. The receiving coil 3210 is used for generating AC power by receiving an inductive power signal which is a low frequency signal according to electromagnetic induction, and the receiving antenna 3220 is used for receiving an AC power signal by receiving a resonant power signal which is a high frequency signal.

The second variable capacitor block 3230 is used for auxiliary impedance matching. In other words, capacitance is changed to perform auxiliary impedance matching for impedance matching between the transmitting coil 3110 or transmitting antenna 3120 of the transmitting block 3A and the receiving coil 3210 or receiving antenna 3220. Under the control of the receiving controller 3240, the capacitance value of the second variable capacitor block 3230 is changed to an auxiliary value, namely to a small size (which is meant to be small compared with the first variable capacitor block 3130) to be used for impedance matching.

It should be understood that although descriptions in this document are based on the hybrid receiving apparatus 3203, the present disclosure is not limited to the current descriptions, but also can be used for inductive power receiving apparatus and magnetic resonant receiving apparatus. In other words, FIG. 14 shows both of the receiving coil 3210 and the receiving antenna 3220. If either of the two is removed, however, the hybrid receiving apparatus corresponds to the inductive power receiving apparatus 3201 or magnetic resonant receiving apparatus 3202. In this case, too, the capacitance value of the second variable capacitor block 3230 is changed to a small value for impedance matching.

In what follows, electrical structures of the first variable capacitor block 3130 of the hybrid wireless power transmitting apparatus 3100 and the second variable capacitor block 3230 of the wireless power receiving apparatus 3200 will be described with reference to FIGS. 15 and 16.

Figure 15:
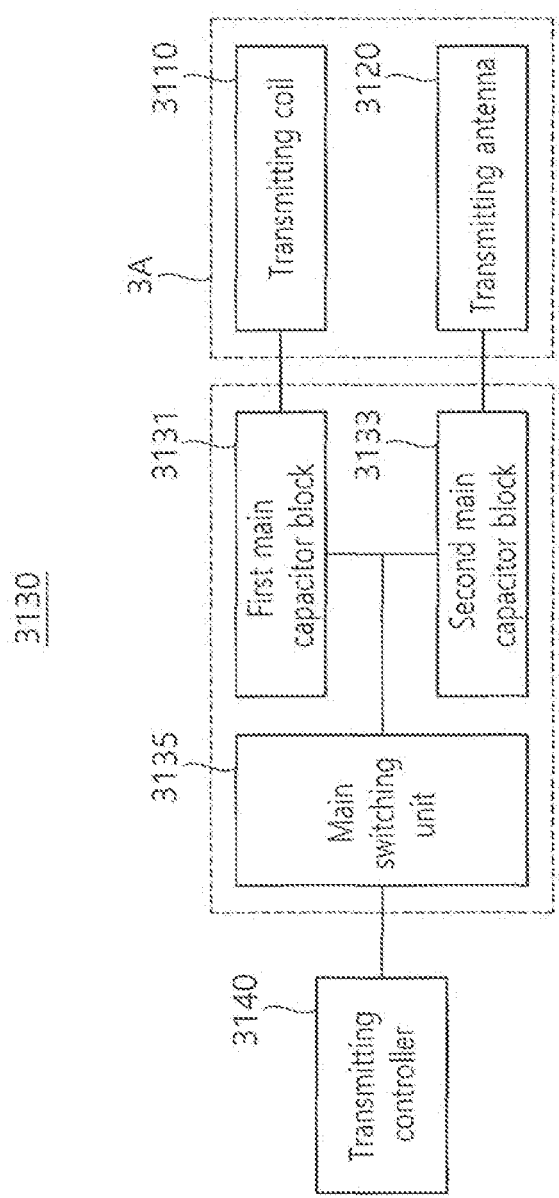
FIG. 15 is a block diagram illustrating an electrical structure of a first variable capacitor block of a hybrid wireless power transmitting apparatus of a wireless power transmitting system capable of transmitting and receiving an inductive power signal and a resonant power signal according to a third embodiment of the present disclosure.

FIG. 15 is a block diagram illustrating an electrical structure of a first variable capacitor block of a hybrid wireless power transmitting apparatus of a wireless power transmitting system capable of transmitting and receiving an inductive power signal and a resonant power signal according to a third embodiment of the present disclosure. FIG. 16 is a block diagram illustrating an electrical structure of a second variable capacitor block of a hybrid wireless power transmitting apparatus of a wireless power transmitting system capable of transmitting and receiving an inductive power signal and a resonant power signal according to a third embodiment of the present disclosure.

First, with reference to FIG. 15, the first variable capacitor block 3130 can comprise a first main capacitor block 3131, second main capacitor block 3133, and main switching unit 3135.

The capacitance value of the first main capacitor block 3131 connected to the transmitting coil 3110 is changed by the control of the transmitting controller 3140 to perform inductive main impedance matching which is impedance matching between the transmitting coil 3110 and the receiving coil 3210.

The capacitance value of the second main capacitor block 3133 connected to the transmitting antenna 3120 is changed by the control of the transmitting controller 3140 to perform resonant main impedance matching which is impedance matching between the transmitting antenna 3120 and the receiving antenna 3220.

If the transmitting controller 3140 transmits an external object detection signal through the transmitting block 3A and identifies the type of a wireless power receiving apparatus by detecting a signal from the corresponding wireless power receiving apparatus 3200, the main switching unit 3135 performs the function of selecting one of the first main capacitor block 3131 and the second main capacitor block 3133 according to the type of the receiving apparatus. In other words, the transmitting controller 3140 checks whether an external object is an inductive power receiving apparatus 3201 or magnetic resonant receiving apparatus 3202 by using the external object detection signal transmitted from the transmitting block 3A and transmits a wireless power signal by operating an auxiliary switching unit 3235 according to the checking result and selecting the corresponding main capacitor block.

And the selected main capacitor block changes its capacitance value on the basis of the ID signal of the receiving apparatus for main impedance matching.

Figure 16:
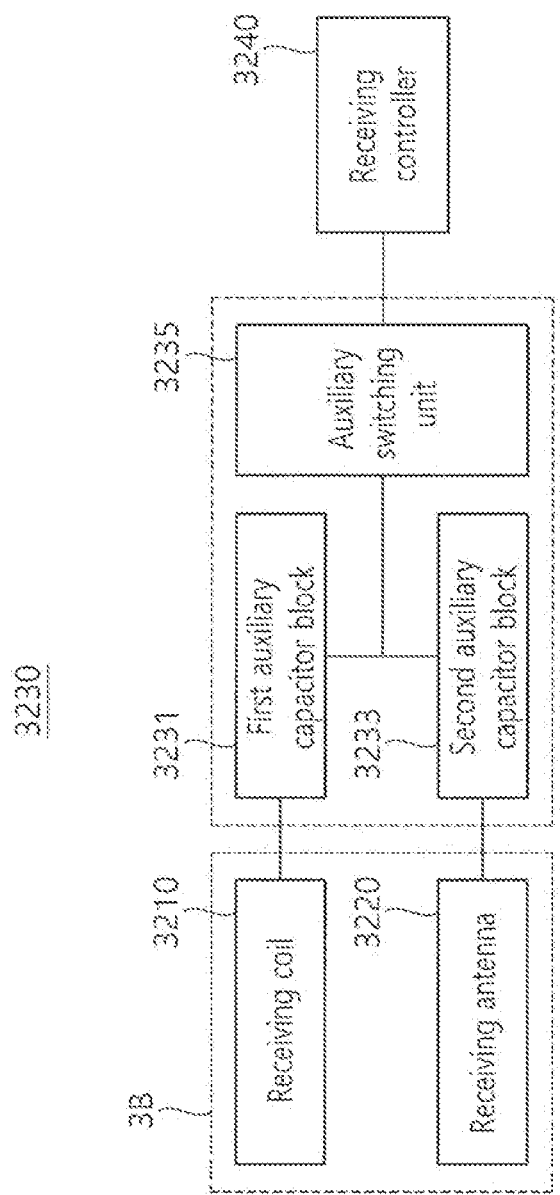
FIG. 16 is a block diagram illustrating an electrical structure of a second variable capacitor block of a hybrid wireless power transmitting apparatus of a wireless power transmitting system capable of transmitting and receiving an inductive power signal and a resonant power signal according to a third embodiment of the present disclosure.

Meanwhile, as shown in FIG. 16, the second variable capacitor block 3230 of the hybrid receiving apparatus 3203 can comprise a first auxiliary block 3231, second auxiliary capacitor block 3233, and auxiliary switching unit 3235.

The capacitance value of the first auxiliary capacitor block 3231 connected to the receiving coil 3210 is changed by the control of the receiving controller 3240 to perform inductive auxiliary impedance matching which is impedance matching between the transmitting coil 3110 and the receiving coil 3210.

The capacitance value of the second auxiliary capacitor block 3233 connected to the receiving antenna 3220 is changed by the control of the receiving controller 3240 to perform resonant auxiliary impedance matching which is impedance matching between the transmitting antenna 3120 and the receiving antenna 3220.

If the receiving controller 3240 detects an external object detection signal through the transmitting block 3A and accordingly identifies the type of a wireless power transmitting apparatus 3100, the auxiliary switching unit 3235 performs the function of selecting one of the first auxiliary capacitor block 3231 and the second auxiliary capacitor block 3233 according to the type of the wireless power transmitting apparatus 3100. In other words, the receiving controller 3240 checks whether the wireless power transmitting apparatus 3100 is an inductive power transmitting apparatus or magnetic resonant transmitting apparatus by using the external object detection signal transmitted from the transmitting block 3A and receives an optimal wireless power signal by operating the auxiliary switching unit 3235 according to the checking result and selecting the corresponding auxiliary capacitor block, thereby performing impedance matching.

In what follows, a circuit structure of a variable capacitor block will be described with reference to FIG. 17. The variable capacitor block described with reference to FIG. 5 can also be applied to the first and the second main capacitor block and the first and the second auxiliary capacitor block of FIGS. 13 and 14. In the appended claims, capacitor is named as "main capacitor, main inductive capacitor, main resonant capacitor, auxiliary capacitor, auxiliary inductive capacitor, or auxiliary resonant capacitor" according to where the variable capacitor block of FIG. 17 is used, while switch is named as "transmitting switch, inductive transmitting switch, resonant transmitting switch, receiving switch, inductive receiving switch, or resonant receiving switch."

Figure 17:
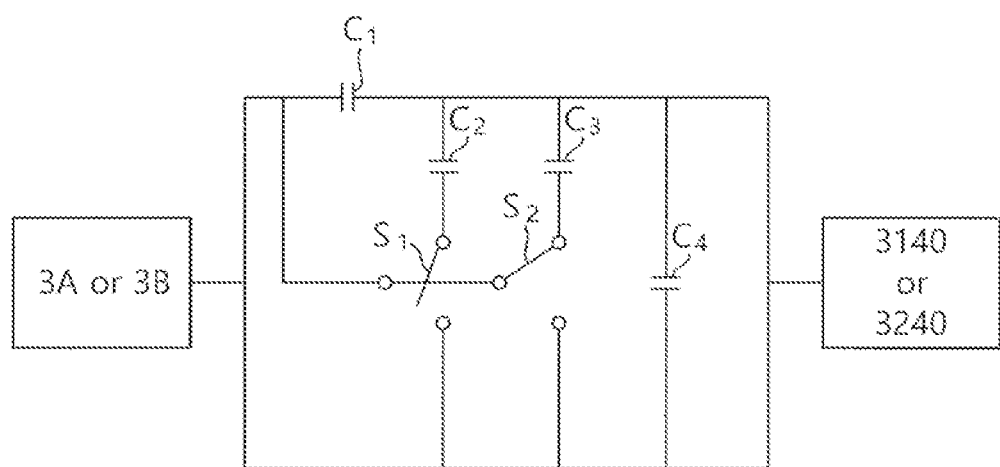
FIG. 17 is a circuit diagram illustrating a variable capacitor block of a wireless power transmitting system capable of transmitting and receiving an inductive power signal and a resonant power signal according to a third embodiment of the present disclosure.

FIG. 17 is a circuit diagram illustrating a variable capacitor block of a wireless power transmitting system capable of transmitting and receiving an inductive power signal and a resonant power signal according to a third embodiment of the present disclosure. As shown in FIG. 17, the variable capacitor block of a wireless power transmitting system capable of transmitting and receiving an inductive power signal and a resonant power signal according to a third embodiment of the present disclosure can comprise a plurality of series-parallel capacitors (C1 to C4) and switches S1, S2 disposed among the capacitors. By using the aforementioned configuration, variable capacitance values can be realized even with a smaller number of capacitors. Accordingly, the number of components used is reduced, contributing to lightening and thinning of products.

According to the third embodiment of the present disclosure above, since both of a wireless power transmitting apparatus and a wireless power receiving apparatus take part in impedance matching, control efficiency for impedance matching is improved.

Also, since change of capacitance for impedance matching is performed through a simple combination of a series-parallel circuit and a switch, various capacitance values can be configured even with a smaller number of capacitors and switches.

Fourth Embodiment

Figure 18:
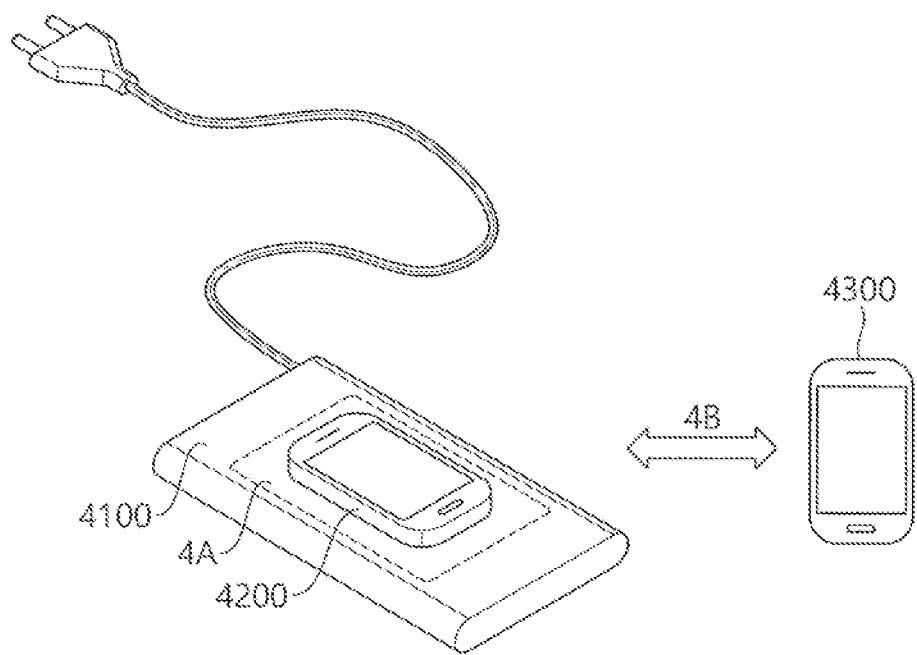
FIG. 18 illustrates a case where a hybrid wireless power transmitting apparatus according to a fourth embodiment of the present disclosure performs resonant charging and inductive charging at the same time.

FIG. 18 is a block diagram illustrating an electrical structure of a wireless power transmitting system capable of transmitting and receiving an inductive power signal and a resonant power signal according to a fourth embodiment of the present disclosure. As shown in FIG. 18, a wireless power system according to the present disclosure can comprise a wireless power transmitting apparatus 4100 and wireless power receiving apparatus 4200.

A hybrid wireless power transmitting apparatus 4100 according to the present disclosure can comprise a transmitting coil 4110 and transmitting antenna 4120, first variable capacitor block 4130, and transmitting controller 4140, where an inductive power receiving apparatus 4201, magnetic resonant receiving apparatus 4202, and hybrid receiving apparatus 4203 can be used as the wireless power receiving apparatus 4200.

More specifically, the transmitting coil 4110 is used for transmitting an inductive power signal which is a wireless power signal due to electromagnetic induction, and the transmitting antenna 4120 is used for transmitting a resonant power signal which is a wireless power signal due to magnetic resonance phenomenon.

The first variable capacitor block 4130 connected to the transmitting coil 4110 and the transmitting antenna 4120 is used to perform inductive main impedance matching or resonant main impedance matching with the transmitting coil and the transmitting antenna when the wireless power receiving apparatus 4200 is located at a charging position (in the case of an inductive power receiving apparatus) or within a charging distance (in the case of a magnetic resonant receiving apparatus).

If an inductive power receiving apparatus is located at a charging position, the transmitting controller 4140 not only operates the transmitting coil 4110 but also performs inductive main impedance matching by controlling the first variable capacitor block 4130. If a magnetic resonant receiving apparatus is located within a charging distance, the transmitting controller 4140 not only operates the transmitting antenna 4120 but also performs resonant main impedance matching by controlling the first variable capacitor block 4130.

At this time, main impedance matching corresponds to auxiliary impedance matching carried out in the wireless power receiving apparatus 4200, which indicates that a relatively large change of capacitance is carried out during impedance matching. Also, auxiliary impedance matching indicates a relatively small change of capacitance carried out during impedance matching between a second variable capacitor block 4230 of the wireless power receiving apparatus 4200 and the transmitting block 4A of the wireless power transmitting apparatus 4100.

As the wireless power transmitting apparatus 4100 is configured as described above, if the wireless power receiving apparatus 4200 is an inductive power receiving apparatus 4201, the first variable capacitor block 4130 is made to carry out inductive main impedance matching while, if the wireless power receiving apparatus 4200 is a magnetic resonant receiving apparatus 4202, the first variable capacitor block 4130 is made to carry out resonant main impedance matching.

According to the fourth embodiment of the present disclosure described above, charging is made possible irrespective of whether the receiving apparatus is a resonance-type or an induction-type. Moreover, since impedance matching with the receiving apparatus is carried out by both of the transmitting and receiving apparatus, burden of the impedance matching on the transmitting apparatus can be reduced.

In what follows, an electrical structure of a hybrid receiving apparatus in a wireless power transmitting system capable of transmitting and receiving an inductive power signal and a resonant power signal according to the fourth embodiment of the present disclosure will be described with reference to FIG. 19.

Figure 19:
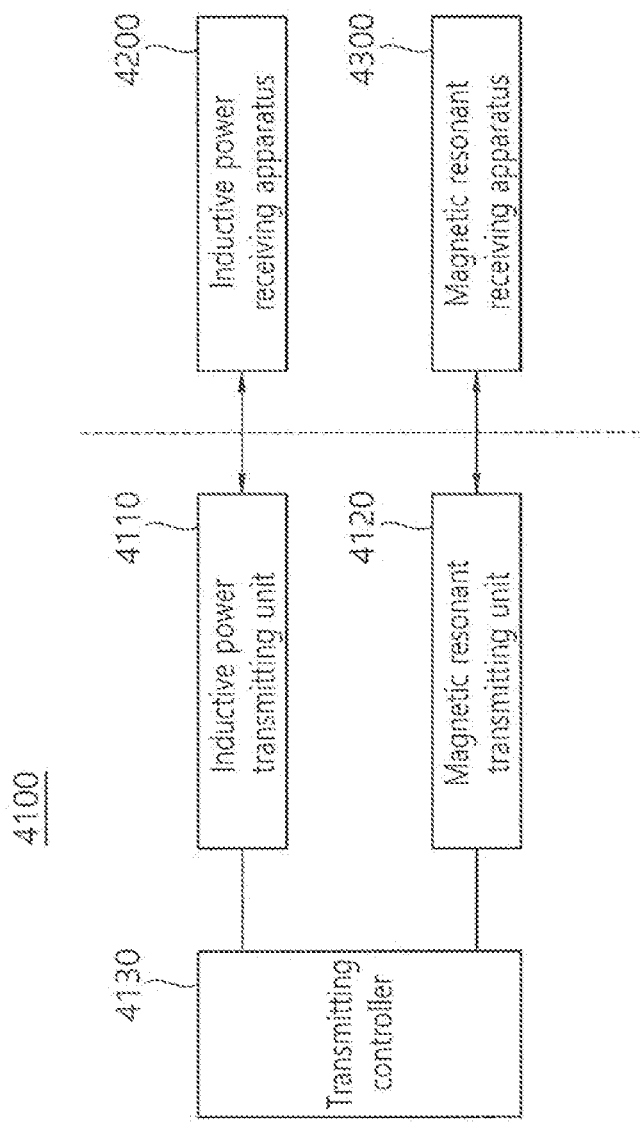
FIG. 19 is a block diagram illustrating an electrical structure of a wireless power transmitting system including a wireless power transmitting apparatus according to a fourth embodiment of the present disclosure.

FIG. 19 is a block diagram illustrating an electrical structure of a hybrid receiving apparatus in a wireless power transmitting system capable of transmitting and receiving an inductive power signal and a resonant power signal according to the fourth embodiment of the present disclosure. As shown in FIG. 19, a hybrid receiving apparatus 4203 can comprise a receiving block 4B, second variable capacitor block 4230, and receiving controller 4240.

The receiving block 4B can comprise a receiving coil 4210 and a receiving antenna 4220. The receiving coil 4210 is used for generating AC power by receiving an inductive power signal which is a low frequency signal according to electromagnetic induction, and the receiving antenna 4220 is used for receiving an AC power signal by receiving a resonant power signal which is a high frequency signal.

The second variable capacitor block 4230 is used for auxiliary impedance matching. In other words, capacitance is changed to perform auxiliary impedance matching for impedance matching between the transmitting coil 4110 or transmitting antenna 4120 of the transmitting block 4A and the receiving coil 4210 or receiving antenna 4220. Under the control of the receiving controller 4240, the capacitance value of the second variable capacitor block 4230 is changed to an auxiliary value, namely to a small size (which is meant to be small compared with the first variable capacitor block 4130) to be used for impedance matching.

It should be understood that although descriptions in this document is based on the hybrid receiving apparatus 4203, the present disclosure is not limited to the current descriptions, but also can be used for inductive power receiving apparatus and magnetic resonant receiving apparatus. In other words, FIG. 19 shows both of the receiving coil 4210 and the receiving antenna 4220. If either of the two is removed, however, the hybrid receiving apparatus corresponds to the inductive power receiving apparatus 4201 or magnetic resonant receiving apparatus 4202. In this case, too, the capacitance value of the second variable capacitor block 4230 is changed to a small value for impedance matching.

In what follows, electrical structures of the first variable capacitor block 4130 of the hybrid wireless power transmitting apparatus 4100 and the second variable capacitor block 4230 of the wireless power receiving apparatus 4200 will be described with reference to FIGS. 20 and 21.

Figure 20:
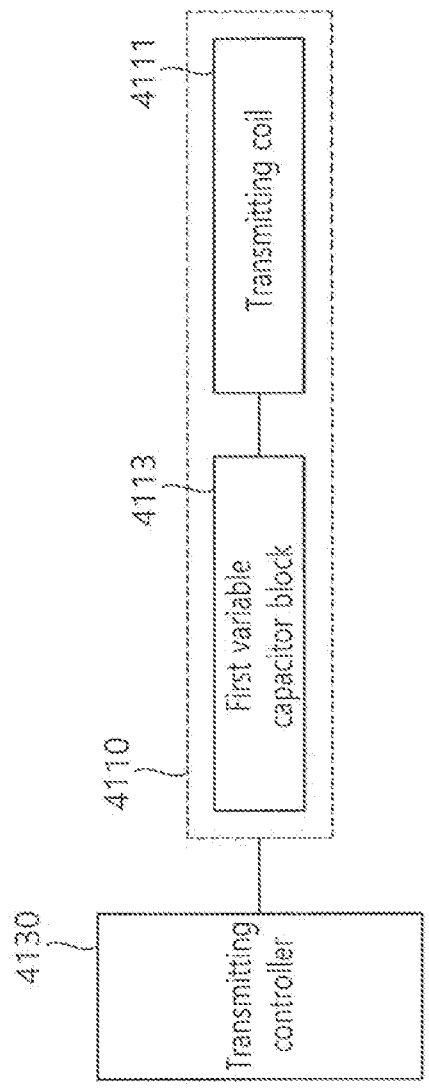
FIG. 20 is a block diagram illustrating an electrical structure of an inductive power transmitting unit of a hybrid wireless power transmitting apparatus according to a fourth embodiment of the present disclosure.

FIG. 20 is a block diagram illustrating an electrical structure of a first variable capacitor block of a hybrid wireless power transmitting unit of a wireless power transmitting system capable of transmitting and receiving an inductive power signal and a resonant power signal according to the fourth embodiment of the present disclosure. FIG. 21 is a block diagram illustrating an electrical structure of a second variable capacitance block of a hybrid receiving apparatus of a wireless power transmitting system capable of transmitting and receiving an inductive power signal and a resonant power signal according to the fourth embodiment of the present disclosure.

First, with reference to FIG. 20, the first variable capacitor block 4130 can comprise a first main capacitor block 4131, second main capacitor block 4133, and main switching unit 4135.

The capacitance value of the first main capacitor block 4131 connected to the transmitting coil 4110 is changed by the control of the transmitting controller 4140 to perform inductive main impedance matching which is impedance matching between the transmitting coil 4110 and the receiving coil 4210.

The capacitance value of the second main capacitor block 4133 connected to the transmitting antenna 4120 is changed by the control of the transmitting controller 4140 to perform resonant main impedance matching which is impedance matching between the transmitting antenna 4120 and the receiving antenna 4220.

If the transmitting controller 4140 transmits an external object detection signal through the transmitting block 4A and identifies the type of a wireless power receiving apparatus by detecting a signal from the corresponding wireless power receiving apparatus 4200, the main switching unit 4135 performs the function of selecting one of the first main capacitor block 4131 and the second main capacitor block 4133 according to the type of the receiving apparatus. In other words, the transmitting controller 4140 checks whether an external object is an inductive power receiving apparatus 4201 or magnetic resonant receiving apparatus 4202 by using the external object detection signal transmitted from the transmitting block 4A and transmits a wireless power signal by operating an auxiliary switching unit 4235 according to the checking result and selecting the corresponding main capacitor block.

And the selected main capacitor block changes its capacitance value on the basis of the ID signal of the receiving apparatus for main impedance matching.

Figure 21:
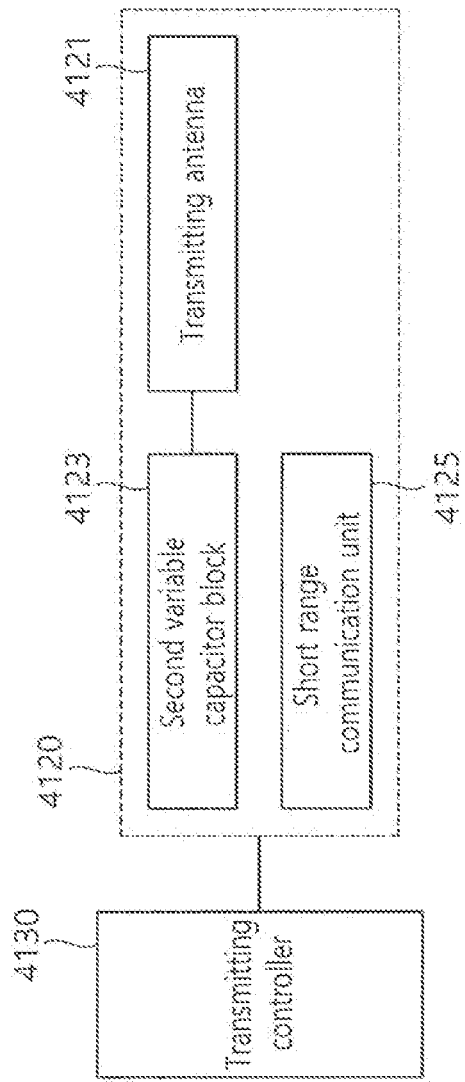
FIG. 21 is a block diagram illustrating an electrical structure of a magnetic resonant transmitting unit of a hybrid wireless power transmitting apparatus according to a fourth embodiment of the present disclosure.

Meanwhile, as shown in FIG. 21, the second variable capacitor block 4230 of the hybrid receiving apparatus 4203 can comprise a first auxiliary block 4231, second auxiliary capacitor block 4233, and auxiliary switching unit 4235.

The capacitance value of the first auxiliary capacitor block 4231 connected to the receiving coil 4210 is changed by the control of the receiving controller 4240 to perform inductive auxiliary impedance matching which is impedance matching between the transmitting coil 4110 and the receiving coil 4210.

The capacitance value of the second auxiliary capacitor block 4233 connected to the receiving antenna 4220 is changed by the control of the receiving controller 4240 to perform resonant auxiliary impedance matching which is impedance matching between the transmitting antenna 4120 and the receiving antenna 4220.

If the receiving controller 4240 detects an external object detection signal through the transmitting block 4A and accordingly identifies the type of a wireless power transmitting apparatus 4100, the auxiliary switching unit 4235 performs the function of selecting one of the first auxiliary capacitor block 4231 and the second auxiliary capacitor block 4233 according to the type of the wireless power transmitting apparatus 4100. In other words, the receiving controller 4240 checks whether the wireless power transmitting apparatus 4100 is an inductive power transmitting apparatus or magnetic resonant transmitting apparatus by using the external object detection signal transmitted from the transmitting block 4A and receives an optimal wireless power signal by operating the auxiliary switching unit 4235 according to the checking result and selecting the corresponding auxiliary capacitor block, thereby performing impedance matching.

In what follows, a circuit structure of a variable capacitor block will be described with reference to FIG. 22. The variable capacitor block described with reference to FIG. 5 can also be applied to the first and the second main capacitor block and the first and the second auxiliary capacitor block of FIGS. 18 and 19. In the appended claims, capacitor is named as "main capacitor, main inductive capacitor, main resonant capacitor, auxiliary capacitor, auxiliary inductive capacitor, or auxiliary resonant capacitor" according to where the variable capacitor block of FIG. 22 is used, while switch is named as "transmitting switch, inductive transmitting switch, resonant transmitting switch, receiving switch, inductive receiving switch, or resonant receiving switch."

Figure 22:
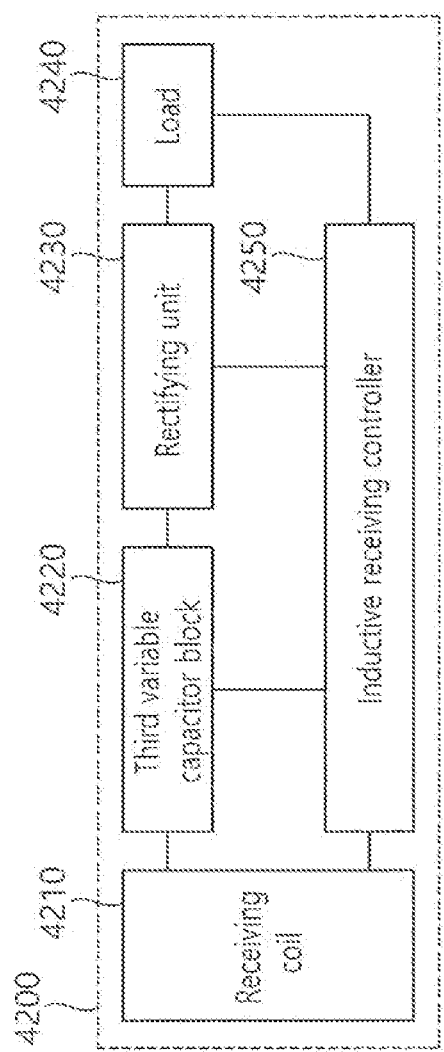
FIG. 22 is a block diagram illustrating an electrical structure of an inductive power receiving apparatus of a wireless power transmitting system of FIG. 19.
Figure 23:
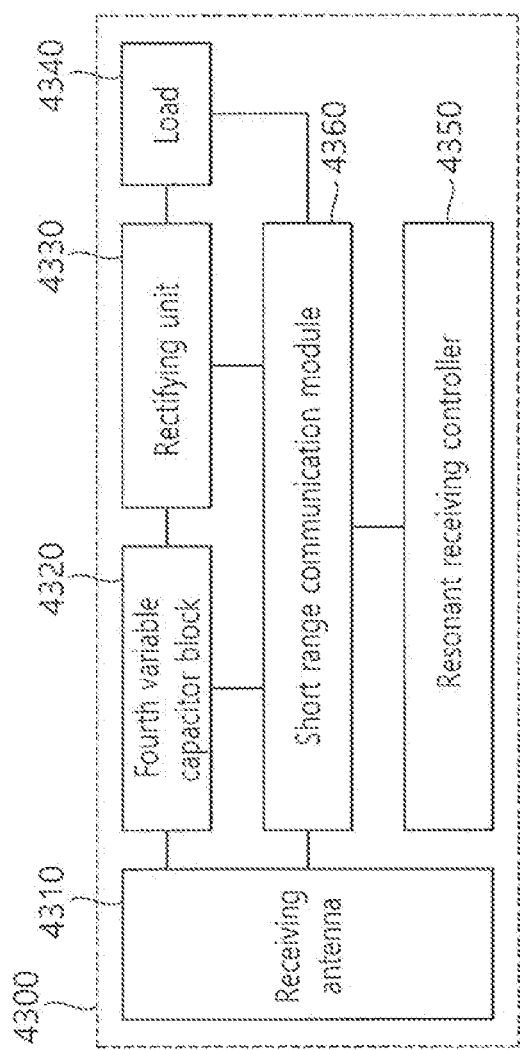
FIG. 23 is a block diagram illustrating an electrical structure of a resonant power receiving apparatus of a wireless power transmitting system of FIG. 19.
Figure 24:
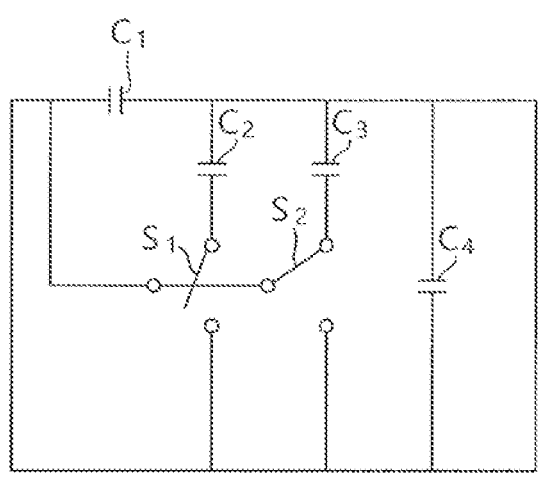
FIG. 24 is a circuit diagram of a first to fourth variable capacitor blocks included in a wireless power transmitting system which includes a hybrid wireless power transmitting apparatus according to a fourth embodiment of the present disclosure.

FIG. 22 is a circuit diagram illustrating a variable capacitor block of a wireless power transmitting system capable of transmitting and receiving an inductive power signal and a resonant power signal according to the fourth embodiment of the present disclosure. As shown in FIG. 22, the variable capacitor block of a wireless power transmitting system capable of transmitting and receiving an inductive power signal and a resonant power signal according to the fourth embodiment of the present disclosure can comprise a plurality of series-parallel capacitors (C1 to C4) and switches S1, S2 disposed among the capacitors. By using the aforementioned configuration, variable capacitance values can be realized even with a smaller number of capacitors. Accordingly, the number of components used is reduced, contributing to lightening and thinning of products.

According to the fourth embodiment of the present disclosure above, since both of a wireless power transmitting apparatus and a wireless power receiving apparatus take part in impedance matching, control efficiency for impedance matching is improved.

Also, since change of capacitance for impedance matching is performed through a simple combination of a series-parallel circuit and a switch, various capacitance values can be configured even with a smaller number of capacitors and switches.

The hybrid wireless power transmitting system and the method for the system according to the present disclosure is not limited to the embodiments described above, but the entire embodiments can be combined or part of the embodiments can be combined selectively so that various modifications can be made to the embodiments.

The invention claimed is:

1. An apparatus for wireless power transfer, comprising:
a first power transmitting unit capable of transmitting a first wireless power signal;
a second power transmitting unit capable of transmitting a second wireless power signal; and
a controller configured to:
   transmit both of a first object detection signal associated with the first power transmitting unit and a second object detection signal associated with the second power transmitting unit,
   receive a response signal from a wireless power receiving apparatus, wherein the response signal is either a first type in response to the first object detection signal or a second type in response to the second object detection signal,
   select, from among the first power transmitting unit and the second power transmitting unit, a selected power transmitting unit based, at least in part, on the response signal, wherein the first power transmitting unit is selected as the selected power transmitting unit when the response signal is the first type, wherein the second power transmitting unit is selected as the selected power transmitting unit when the response signal is the second type, and
   cause a transmission of the first wireless power signal or the second wireless power signal to the wireless power receiving apparatus via the selected power transmitting unit.

2. The apparatus of claim 1, wherein the first power transmitting unit is capable of transmitting the first wireless power signal using magnetic induction and the second power transmitting unit is capable of transmitting the second wireless power signal using magnetic resonance.

3. The apparatus of claim 1, wherein the controller is further configured to:
receive, from the wireless power receiving apparatus, resonant voltage information indicating a resonant voltage corresponding to the second object detection signal;
select the first power transmitting unit as the selected power transmitting unit when the resonant voltage information indicates that the resonant voltage is above a reference voltage; and select the second power transmitting unit as the selected power transmitting unit when the resonant voltage information indicates that the resonant voltage is below the reference voltage.

4. The apparatus of claim 1, wherein the controller is further configured to:
receive power status information from the wireless power receiving apparatus through a near communication module or a transmitting coil of the selected power transmitting unit, and
control the selected power transmitting unit based on the power status information.

5. The apparatus of claim 1, wherein the controller is further configured to:
determine whether the wireless power receiving apparatus is an inductive wireless power receiving apparatus or a resonant wireless power receiving apparatus based, at least in part, on whether the response signal is the first type or the second type, respectively.

6. The apparatus of claim 1,
wherein the first power transmitting unit includes a transmitting coil, and
wherein the second power transmitting unit includes a transmitting antenna.

7. The apparatus of claim 6, further comprising:
a first variable capacitor block connected to the transmitting coil and the transmitting antenna.

8. The apparatus of claim 7, wherein the controller is further configured to:
perform an inductive main impedance matching by controlling the first variable capacitor block and by operating the transmitting coil when the selected power transmitting unit is the first power transmitting unit, and
perform a resonant main impedance matching by controlling the first variable capacitor block and by operating the transmitting antenna when the selected power transmitting unit is the second power transmitting unit.

9. The apparatus of claim 7, wherein the first variable capacitor block includes:
a first main capacitor block connected to the transmitting coil;
a second main capacitor block connected to the transmitting antenna; and
a main switching unit configured to select one of the first main capacitor block and the second main capacitor block under control of the controller.

10. The apparatus of claim 9,
wherein the first main capacitor block includes a plurality of main inductive capacitors connected in serial or parallel with each other,
wherein the first main capacitor block further includes an inductive transmitting switch connected between the plurality of main inductive capacitors, and
wherein the controller performs inductive main impedance matching by turning on and off the inductive transmitting switch.

11. The apparatus of claim 9,
wherein the second main capacitor block includes a plurality of main resonant capacitors connected in serial or parallel with each other,
wherein the second main capacitor block further includes a resonant transmitting switch connected between the plurality of main resonant capacitors, and
wherein the controller performs a resonant main impedance matching by turning on and off the resonant transmitting switch.

12. The apparatus of claim 1,
wherein the first power transmitting unit is further configured to transmit the first object detection signal and the second power transmitting unit is configured to transmit the second object detection signal, and
wherein the first object detection signal and the second object detection signal are transmitted in alternating fashion.

13. The apparatus of claim 1, wherein the controller is configured to:
receive a plurality of response signals from the wireless power receiving apparatus, the plurality of response signals including at least a first response signal of the first type in response to the first object detection signal and a second response signal of the second type in response to the second object detection signal, wherein the first response signal indicates inductive frequency information corresponding to the first object detection signal, and wherein the second response signal indicates a resonant voltage corresponding to the second object detection signal,
cause transmission of the first wireless power signal via the first power transmitting unit when a difference between a frequency indicated in the inductive frequency information and a reference frequency is less than a predetermined amount and the resonant voltage is above a reference voltage, and
cause transmission of the second wireless power signal via the second power transmitting unit when a difference between the frequency indicated in the inductive frequency information and the reference frequency is more than the predetermined amount and the resonant voltage is below the reference voltage.

14. A method for wireless power transfer, the method comprising:
transmitting both of a first object detection signal associated with a first power transmitting unit and a second object detection signal associated with a second power transmitting unit, wherein the first power transmitting unit is capable of transmitting a first wireless power signal and the second power transmitting unit is capable of transmitting a second wireless power signal;
receiving a response signal from a wireless power receiving apparatus, wherein the response signal is either a first type in response to the first object detection signal or a second type in response to the second object detection signal;
selecting, from among the first power transmitting unit and the second power transmitting unit, a selected power transmitting unit based, at least in part, on the response signal, wherein the first power transmitting unit is selected as the selected power transmitting unit when the response signal is the first type, wherein the second power transmitting unit is selected as the selected power transmitting unit when the response signal is the second type; and
causing a transmission of the first wireless power signal or the second wireless power signal to the wireless power receiving apparatus via the selected power transmitting unit.

15. The method of claim 14, wherein the first power transmitting unit is capable of transmitting the first wireless power signal using magnetic induction and the second power transmitting unit is capable of transmitting the second wireless power signal using magnetic resonance.

16. The method of claim 14, further comprising:
receiving, from the wireless power receiving apparatus, resonant voltage information indicating a resonant voltage corresponding to the second object detection signal;
selecting the first power transmitting unit as the selected power transmitting unit when the resonant voltage information indicates that the resonant voltage is above a reference voltage; and
selecting the second power transmitting unit as the selected power transmitting unit when the resonant voltage information indicates that the resonant voltage is below the reference voltage.

17. The method of claim 14, further comprising:
receiving power status information from the wireless power receiving apparatus through a near communication module or a transmitting coil of the selected power transmitting unit, and
controlling the selected power transmitting unit based on the power status information.

18. The method of claim 14, further comprising:
determining whether the wireless power receiving apparatus is an inductive wireless power receiving apparatus or a resonant wireless power receiving apparatus based, at least in part, on whether the response signal is the first type or the second type, respectively.

19. The method of claim 14, wherein the first power transmitting unit includes a transmitting coil and the second power transmitting unit includes a transmitting antenna.

20. The method of claim 19, further comprising:
performing an inductive main impedance matching by controlling a variable capacitor block connected to the transmitting coil and operating the transmitting coil when the selected power transmitting unit is the first power transmitting unit, and
performing a resonant main impedance matching by controlling the variable capacitor block connected to the transmitting antenna and operating the transmitting antenna when the selected power transmitting unit is the second power transmitting unit.

\* \* \* \* \*